(12) United States Patent
Kobayashi et al.

(10) Patent No.: US 7,010,800 B2
(45) Date of Patent: *Mar. 7, 2006

(54) DISC CARTRIDGE HAVING ANNULAR SHAPED MATING PROJECTIONS

(76) Inventors: Daiki Kobayashi, c/o Sony Corporation 7-35 Kitashinagawa 6-chome, Shinagawa-ku, Tokyo (JP); Takatsugu Funawatari, c/o Sony Corporation 7-35 Kitashinagawa 6-chome, Shinagawa-ku, Tokyo (JP); Kenji Takahashi, c/o Sony Corporation 7-35 Kitashinagawa 6-chome, Shinagawa-ku, Tokyo (JP)

( * ) Notice: Subject to any disclaimer, the term of this patent is extended or adjusted under 35 U.S.C. 154(b) by 75 days.

This patent is subject to a terminal disclaimer.

(21) Appl. No.: 11/086,362

(22) Filed: Mar. 23, 2005

(65) Prior Publication Data

US 2005/0162779 A1    Jul. 28, 2005

Related U.S. Application Data

(63) Continuation of application No. 08/696,891, filed as application No. PCT/JP95/02644 on Dec. 22, 1995.

(30) Foreign Application Priority Data

Dec. 22, 1994  (JP)  .................................. P6-321047
Jun. 6, 1995  (JP)  .................................. P7-139593

(51) Int. Cl.
    *G11B 23/00*      (2006.01)
(52) U.S. Cl. ...................................... 720/727; 360/133
(58) Field of Classification Search ................ 360/133; 720/725, 727, 728
    See application file for complete search history.

(56) References Cited

U.S. PATENT DOCUMENTS

| 4,747,001 A |   | 5/1988  | Kokubo et al. |
|---|---|---|---|
| 4,757,958 A |   | 7/1988  | Elliot et al. |
| 4,831,482 A |   | 5/1989  | Sato |
| 4,970,618 A | * | 11/1990 | Kato et al. .................. 360/133 |
| 5,074,487 A |   | 12/1991 | Okamura et al. |
| 5,081,556 A | * | 1/1992  | Ikebe et al. .................. 360/133 |
| 5,195,084 A | * | 3/1993  | Shiba et al. ................ 720/739 |
| 5,199,593 A |   | 4/1993  | Kita |
| 5,200,871 A | * | 4/1993  | Hughes ...................... 360/133 |

(Continued)

FOREIGN PATENT DOCUMENTS

JP      60-51675       4/1985

(Continued)

*Primary Examiner*—Brian E. Miller

(57) ABSTRACT

A disc cartridge accommodating an optical disc in a cartridge body. The disc cartridge includes a cartridge body formed by mating and joining upper and lower halves mated together. A plurality of fusing portions for mating and fusing the upper and lower halves are provided at positions corresponding to recess portions for accommodating an optical disc. Each fusing portion is provided with a mating projection formed at one of the upper and lower halves and a mating projection formed at the other of the upper and lower halves. A plurality of mating projections formed at either half comprise mating projections having projections for fusing annularly and continuously formed over the entire circumference of the end surfaces to be mated to the mating projections of the other half and mating projections having projections for fusing formed in the form of an arc in one part of the end surfaces.

1 Claim, 16 Drawing Sheets

U.S. PATENT DOCUMENTS

| | | |
|---|---|---|
| 5,212,614 A | 5/1993 | Hughes et al. |
| 5,307,229 A * | 4/1994 | Sata .......................... 360/133 |
| 5,515,358 A * | 5/1996 | Goto .......................... 720/743 |
| 5,576,917 A | 11/1996 | Shimokuni |
| 5,868,338 A | 2/1999 | Martin et al. |
| 6,532,133 B1 | 3/2003 | Kaneda et al. |

FOREIGN PATENT DOCUMENTS

| | | |
|---|---|---|
| JP | 61-76751 | 5/1986 |
| JP | 61-187073 | 11/1986 |
| JP | 63-181176 | 11/1988 |

* cited by examiner

DISC CARTRIDGE HAVING ANNULAR SHAPED MATING PROJECTIONS

TECHNICAL FIELD

The present invention relates to a disc cartridge accommodating a disk-like recording medium such as an optical disc on which a data signal is recorded, more particularly relates to a disc cartridge in which a disk-like recording medium is accommodated in a cartridge body formed by placing together and connecting a pair of upper and lower halves formed by shaping a plastic material.

BACKGROUND ART

Conventionally, a disc cartridge accommodating a disk-like recording medium such as an optical disc on which a data signal is recorded is constituted by being provided with a cartridge body formed by placing together and connecting a pair of upper and lower halves formed by shaping a plastic material such as an ABS resin and by accommodating the disk-like recording medium in this cartridge body so that it can rotate. The disc cartridge is mounted in a recording and/or reproducing apparatus in a state with the disk-like recording medium accommodated therein as it is. The disk-like recording medium accommodated in the cartridge body is chacked on a disc table constituting part of the disc rotating mechanism with a center portion arranged on the recording and/or reproducing apparatus side and is operated to rotate together with the disc table.

In a disc cartridge using an optical disc as the disk-like recording medium, when the optical disc accommodated in the cartridge body is chacked on the disc table and rotated together with the disc table, the signal recording portion formed on the main surface is scanned by a light beam emitted from an optical pick-up so as to reproduce the recorded data signal.

Further, when recording a data signal, an external magnetic field subjected to magnetic field modulation in accordance with the data signal to be recorded from a magnetic head serving as an external magnetic field generation means is applied to this signal recording portion in a state where the light beam emitted from the optical pick-up is irradiated to the signal recording portion of the optical disc so as to record a predetermined data signal.

The optical disc accommodated in the disc cartridge is generally constituted by a disc substrate formed by shaping a transparent plastic material and a hub for magnetic clamping which is formed by a magnetic plate such as a metal plate and installed in a center hole provided at the center portion of this disc substrate. On the main surface of this disc is provided a signal recording portion on which recording tracks in which the data signal is recorded are formed in concentric circles around the center hole.

In the lower half of the cartridge body is provided a central opening which is positioned at the center and into which a circular disc table constituting part of the disc rotating mechanism intrudes is inserted. This central opening specifically makes the hub for the magnet clamping attached to the disc substrate so as to cover the center hole face outward.

Further, in the upper half and lower half of the cartridge body, openings for recording and/or reproduction which make one part of a data signal recording portion provided on the main surface of the optical disc face outward over the inner and outer circumferences and to which recording and reproduction means such as an optical pick-up or an external magnetic field generation means arranged on the recording and/or reproducing apparatus side face are provided at facing positions. These openings for recording and/or reproduction are positioned at the center of the cartridge body in the horizontal direction and are constituted as rectangular openings covering an area from the front side to a position close to the central opening. Note that, in a disc cartridge accommodating an optical disc used only for reproduction, only an opening for reproduction is formed in the lower half side—the upper half side is closed.

Further, the disc cartridge has movably attached to it a shutter member for closing the opening for recording and/or reproduction to prevent the intrusion of the dust etc. into the cartridge body and, at the same time, for preventing damage to the optical disc accommodated in the cartridge body in a state when the cartridge is not loaded in the recording and/or reproducing apparatus. This shutter member is moved from the position closing the opening for recording and/or reproduction to the opening position by a shutter opening member provided on the recording and/or reproducing apparatus side by the operation of loading the disc cartridge in the recording and/or reproducing apparatus. Further, when the disc cartridge is loaded in the recording and/or reproducing apparatus, the disc cartridge bull enters via the central opening and the optical disc accommodated in the cartridge body is chacked on this disc table.

Note that the upper half and lower half of the cartridge body are formed as generally shallow dish-like rectangular shapes with rising circumferential walls constituting the circumferential side wall of the cartridge body integrally formed along the circumferential edges. Further, on the inner surfaces at which the upper and lower halves face each other, annular walls for forming the portion accommodating the recording medium which are mated with each other to form the disc accommodating portion are formed so as to be inscribed in the rising circumferential walls. At the same time, mating projections which constitute a plurality of fusing portions which are to be mated with each other and joined are provided. These mating projections are arranged at appropriate positions of the inner surfaces at which the upper half and lower half face each other so that no gap will be produced between these upper half and lower half when the upper half and the lower half are mated and joined and so that therefore no dust etc. will intrude into the inside.

Here, explaining the mating projections provided so as to join the upper and lower halves by fusing, these mating projections 101 and 103 are provided on the surfaces at which the upper half 100 and the lower half 102 to be mated and joined to each other and constituting the cartridge body face each other as shown in FIG. 1 and FIG. 2. These mating projections 101 and 103 are formed in a cylindrical shape. A projection 105 for the fusing of a thickness which becomes narrower toward the front end is integrally formed on an end surface 104 of the mating projection 103, provided in the lower half 102, to which an end surface 106 of the mating projection 101 provided on the upper half 100 faces. This projection 105 is formed in the shape of a ring over the entire circumference of the end surface 106 of the mating projection 101.

Note that, the mating projections 101 and 103 are provided in a region surrounded by the rising circumferential walls provided on the upper and lower halves 100 and 102 constituting the circumferential walls of the cartridge body and annular walls forming the portion accommodating the recording medium constituting the disc accommodating portion.

The mating projections 101 and 103 are fused together by melting the projections 105 by application of an ultrasonic wave to the end surfaces 104 and 106 which are mated with each other in a state where the upper half 100 and the lower half 102 are connected with each other. Namely, by fusing the mating projections 101 and 103, the upper and lower halves 100 and 102 are joined with each other to constitute the cartridge body.

Note that in the ultrasonic welding method, when an ultrasonic welding device is driven in a state where the phone for generating the ultrasonic wave of the ultrasonic welding device is pressed against the main surface of either of the upper half 100 or the lower half 102 acting as the body to be fused and the ultrasonic wave is applied to the upper and lower halves 100 and 102 via the phone, the ultrasonic wave concentrates at the mated portion, that is, between the end surface 106 of the mating projection 101 provided on the upper half 100 side and the projection 105 formed on the end surface 104 of the mating projection 103 provided on the lower half 102 side so ultrasonic vibration is generated in this mated portion. The mated portion is hated due to this ultrasonic vibration, whereby the projection 105 is melted to fuse the end surfaces 106 and 104 of the mating projections 101 and 103.

In a disc cartridge connecting the upper and lower halves 100 and 102 by using the ultrasonic welding method as mentioned above, a plurality of mating projections 101 and 103 are provided on the upper and lower halves 100 and 102 and these mating projections 101 and 103 are simultaneously fused together. Further, the projection 105 for the fusing formed on the mating projection 103 on the lower half 102 side fused by the application of the ultrasonic wave is formed as a ring covering the entire circumference of the end surface 104 of the mating projection 103. For this reason, there is a case where it becomes difficult to uniformly fuse all of the plurality of sets of mating projections 101 and 103.

In order to simultaneously apply the ultrasonic wave to a plurality of sets of mating projections 101 and 103 to melt the projections105 and perform the ultrasonic welding, the time for applying the ultrasonic wave to the upper and lower halves 100 and 102 becomes long.

Further, in the disc cartridge, to prevent the staining due to the adhesion of dust etc. from being conspicuous, fine pebbling formed in the main surface on the outside of the upper and lower halves of the cartridge body. Such fine pebbling is smoothed by the contact of the phone of the ultrasonic welding device over a long time. As a result, a contact mark is formed at the portion where the phone comes into contact and the sense of beauty of the outer appearance is degraded.

Further, there also exists a concern that, due to the application of an ultrasonic wave over a long time, the optical disc will vibrate in the cartridge body, rubbing will occur between the optical disc and the walls forming the portion accommodating the recording medium constituting the disc accommodating portion, and the optical disc will be scratched or shaving powder will be generated. When the shaving powder is generated and adhers to the signal recording portion, there also exists a concern of occurrence of the omissions in the recording and/or reproduction of the data signal.

Further, in a disc cartridge accommodating a disk-like recording medium such as an optical disc or magnetic disc, use is made of a disc cartridge which may accommodate disk-like recording media of different types but having generally the same size in the cartridge body. For example, use is made of a disc cartridge accommodating an optical disc or magnetic disc having a diameter of 3.5 inch. In this type of disc cartridge, since the size of the disk-like recording media to be accommodated in the cartridge body is generally made the same, the size of the cartridge bodies is generally made the same. In this way, in a disc cartridge accommodating an optical disc or magnetic disc of a diameter of 3.5 inch, it becomes extremely difficult to distinguish the two from the outer appearance. For this reason, there also exists a concern over erroneous loading, for example, erroneously loading a disc cartridge accommodating an optical disc of a diameter of 3.5 inches or a disc cartridge accommodating a magnetic disc of a diameter of 3.5 inch in the recording and/or reproducing apparatus.

Further, in a recording and/or reproducing apparatus using a disc cartridge accommodating an optical disc as the recording medium and a recording and/or reproducing apparatus using a disc cartridge accommodating a magnetic disc as the recording medium, the recording and/or reproduction means are completely different, so if the cartridges are erroneously loaded in the apparatuses, there is a concern that not only will the recording and/or reproduction of the data signal not be carried out, but also the recording and/or reproduction means such as the optical pick-up or the magnetic head provided on the recording and/or reproducing apparatus side will be damaged.

Therefore, in the disc cartridge which accommodates disk-like recording media of different types but having generally the same size in the cartridge body, to prevent the disc cartridges from being loaded in an apparatuses other than the suitable recording and/or reproducing apparatuses, a means is provided for preventing erroneous loading. As this means for preventing erroneous loading, a means providing a recess or engagement groove in one part of the cartridge body has been known. These recess and engagement grooves for preventing erroneous loading enable the loading of only the disc cartridge suited to the recording and/or reproducing apparatus by engagement of one part of the mechanism for preventing erroneous loading provided on the recording and/or reproducing apparatus side or non-engagement of one part of the mechanism for preventing erroneous loading.

In a disc cartridge wherein the type of the disc cartridge is identified and the loading of the same to an apparatus other than the suitable recording and/or reproducing apparatus is inhibited by providing the recess or engagement groove in one part of the cartridge body in this way, there is a concern that, if the disc cartridge is erroneously loaded in the recording and/or reproducing apparatus, the cartridge body will be damaged when the mechanism for preventing erroneous loading is engaged with the recess or engagement groove with which it should not originally be engaged. Particularly, in a disc cartridge wherein the upper and lower halves are joined by ultrasonic welding, there is a concern that the upper and lower halves will come apart.

DISCLOSURE OF THE INVENTION

An object of the present invention is to provide a disc cartridge able to accommodate disk-like recording media of different types having a common size which facilitates the identification of the disc cartridges having a generally common shape and can prevent damage to the cartridge body even in a case where the disc cartridge is loaded in an unsuitable recording and/or reproducing apparatus.

Another object of the present invention is to provide a disc cartridge which enables reliable joining of the upper half and the lower half of the cartridge body by using the ultrasonic welding method.

Still another object of the present invention is to provide a disc cartridge which enables reliable joining of the upper half and the lower half of the cartridge body while shortening the time of applying the ultrasonic wave.

Further another object of the present invention is to provide a disc cartridge which enables joining of the upper half and the lower half by using the ultrasonic welding method without detracting from the outer appearance of the cartridge body.

A disc cartridge according to the present invention proposed so as to achieve the above objects comprises a disk-like recording medium in which a data signal is recorded; a cartridge body exhibiting a rectangular shape formed by mating and joining a pair of upper and lower halves in which rising circumferential walls which mate with each other to constitute the circumferential side walls are formed at the circumferential edges and, at the same time, in which walls for forming an accommodating portion which are mated with each other at mating inner surfaces to constitute the recording medium accommodating portion in which the disk-like recording medium is accommodated are formed; openings for recording and reproduction which are positioned at a center of the cartridge body in the horizontal direction and formed in the upper and lower surfaces of the cartridge body over an area from the vicinity of the center of the cartridge body to the front side and make one part of the signal recording region of the disk-like recording medium face outward over the radial direction; a shutter member which is provided with a shutter portion for opening or closing these openings and is attached to the cartridge body so that it can move along the front surface of the cartridge body; a recess portion for preventing erroneous loading formed on the two sides of the cartridge body and on the lower half side from the front side to midway of the back side; and a plurality of fusing portions for mating and fusing the upper and lower halves at the facing surfaces of the upper and lower halves.

Here, each fusing portion for mating and fusing the upper and lower halves is provided with a mating projection formed at one of the upper and lower halves and a mating portion formed at the other. The plurality of mating projections formed at either of the halves each comprises a mating projection having a projection for fusing formed annularly and continuously over the entire circumference of the end surface for mating to the mating projection of the other half and a mating portions having a projection for fusing formed at one part of the end surface in the form of an arc.

The mating portion on which the projection for fusing formed in the form of arc is formed is formed on one half with the projection positioned on the rising circumferential wall side.

Alternatively, each fusing portion for mating and fusing together the upper and lower halves is provided with a mating projection formed at one of the upper and lower halves and a mating portion formed at the other and, for the plurality of mating projections formed at either half, mating projections in which a plurality of projections for fusing are formed annularly and continuously on the end surface for mating to the mating projection of the other half are used.

Alternatively, each fusing portion for mating and fusing together the upper and lower halves is provided with a mating projection formed at one of the upper and lower halves and a mating portion formed at the other. As the plurality of mating projections formed at either half, use is made of mating projections each constituted by a mating portion having a projection for fusing formed in the form of an arc at one part of the end surface to be mated to the mating projection of the other half and a mating portion formed with a plurality of projections for fusing formed annularly and continuously on the end surface.

Here, a mating portion in which the projection for fusing formed in the form of the arc is formed at one half with the projection positioned on the rising circumferential wall side.

Further, at least one fusing portion is provided positioned at the two sides of the cartridge body at which the recess portions for preventing the erroneous loading are formed. By providing the fusing portions connecting the upper and lower halves positioned at the two sides at which the recess portions for preventing the erroneous loading are formed, the portions in which the recess portions are formed are tightly connected.

In the disc cartridge according to the present invention, projections are formed on the two sides of the portion for movement of the shutter member formed on front side of the cartridge body over the range of movement in which the shutter member opens or closes the opening and at least one fusing portion for mating and fusing the upper and lower halves is provided in the region of these projections.

Further, a spring biasing the shutter member in a direction closing the opening is arranged in the region surrounded by the circumferential side wall of one corner of the front side of the cartridge body and the walls forming the accommodating portion constituting the recording medium accommodating portion; and at least one fusing portion for mating and fusing the upper and lower halves is provided in the region surrounded by the circumferential side wall on the other corner of the front side of the cartridge body and the walls forming the accommodating portion constituting the recording medium accommodating portion.

Here, the fusing portion provided in the region surrounded by the circumferential side wall on the other corner of the front side of the cartridge body and the walls forming the accommodating portion constituting the recording medium accommodating portion is provided with a mating projection formed at one of the upper and lower halves and a mating portion formed at the other and is formed with a plurality of projections for fusing are annularly and continuously formed on the mating end surface of the mating projection cylindrically formed at either one half.

In the region surrounded by the circumferential side wall on the other corner of the front side of the cartridge body and the walls forming the accommodating portion constituting the recording medium accommodating portion, provision is further made of a fusing portion for mating and fusing the upper and lower halves at a position closer to the circumferential side wall than the side of the wall forming the accommodating portion.

In the disc cartridge according to the present invention, a thin portion having a thickness less than that of the cartridge body formed by mating of the upper and lower halves is provided at a position on the front side of the opening formed in the cartridge body and at schematically a center of the cartridge body in the thickness direction. A fusing portion for mating and fusing the upper and lower halves is provided in this thin portion.

In the disc cartridge according to the present invention, a positioning mechanism for positioning the mating positions of the upper and lower halves in a direction parallel to the direction of movement of the shutter member is provided at one corner on the back side opposite to the front side at which the shutter member of the cartridge body moves and, at the same time, a positioning mechanism for positioning the mating positions of the upper and lower halves in a direction orthogonal to the direction of movement of the shutter member is provided at the other corner on the back side of the cartridge body. Fusing portions for mating and fusing the upper and lower halves are provided in the vicinity of the respective positioning mechanisms. The fusing portions provided here are each provided with a mating projection formed at one of the upper and lower halves and a mating projection formed at the other and has a projection for fusing formed in one part of the mating end surface of the mating projection formed at either half. This projection for fusing is formed in schematically an arc shape at one part of the mating end surface of the cylindrically formed mating projection.

Here, the positioning mechanism for positioning the mating positions of the upper and lower halves in a direction parallel to the direction of movement of the shutter member comprises a pair of cylindrical bodies for mating with each other provided at the upper and lower halves. Further, the positioning mechanism for positioning the mating positions of the upper and lower halves in the direction orthogonal to the direction of movement of the shutter member comprises a cylindrical portion exhibiting a long oval shape having facing surfaces parallel to the direction of movement of the shutter member and a pair of parallel projections fitted over the facing surfaces of the cylindrical portion. The cylindrical body and cylindrical portion provided on the lower half side have formed in them a positioning hole with which a positioning pin on the recording and/or reproducing apparatus side is engaged.

BEST MODE FOR WORKING THE INVENTION

Figure 1:
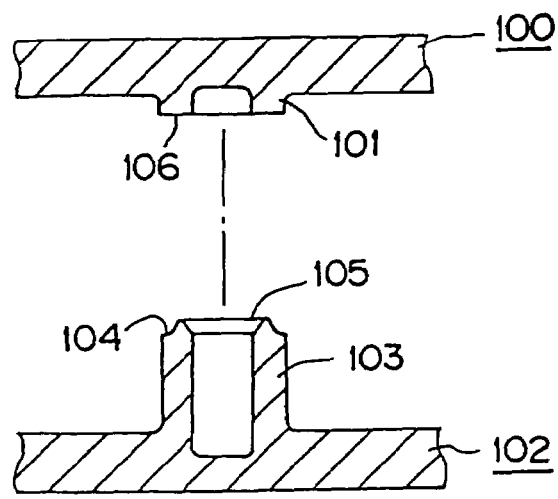
FIG. 1 is a vertical sectional view showing the configuration of mating projections formed on the facing inner surfaces so as to join and fix an upper half and a lower half of a cartridge body of a conventional disc cartridge.
Figure 2:
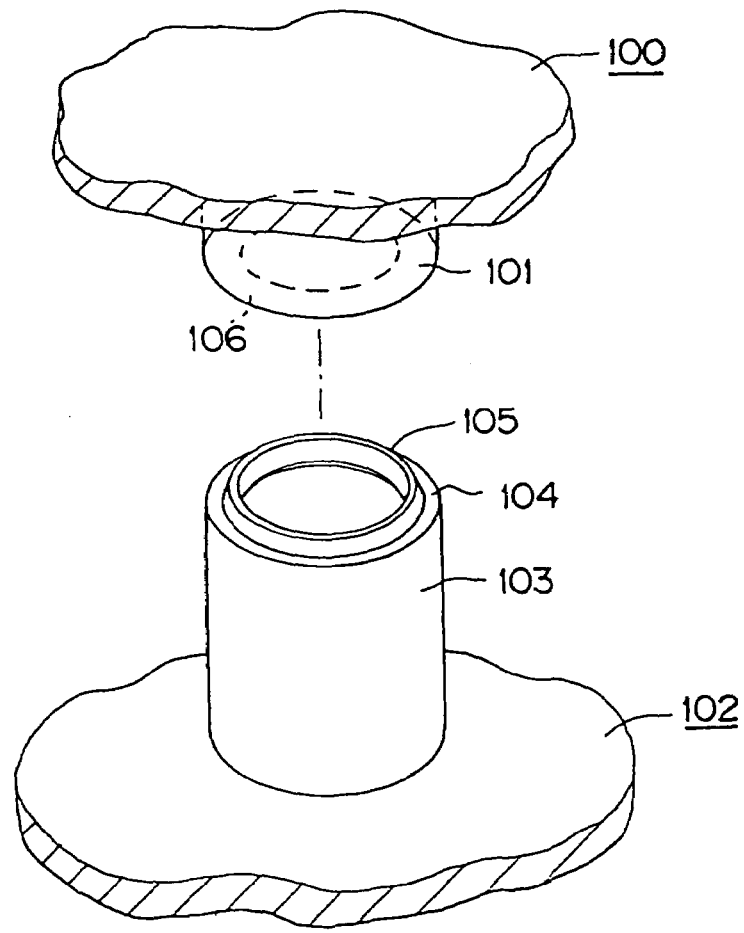
FIG. 2 is a perspective view showing mating projections provided at the upper and lower halves of the disc cartridge.

Below, the disc cartridge according to the present invention will be explained by referring to the drawings.

Figure 3:
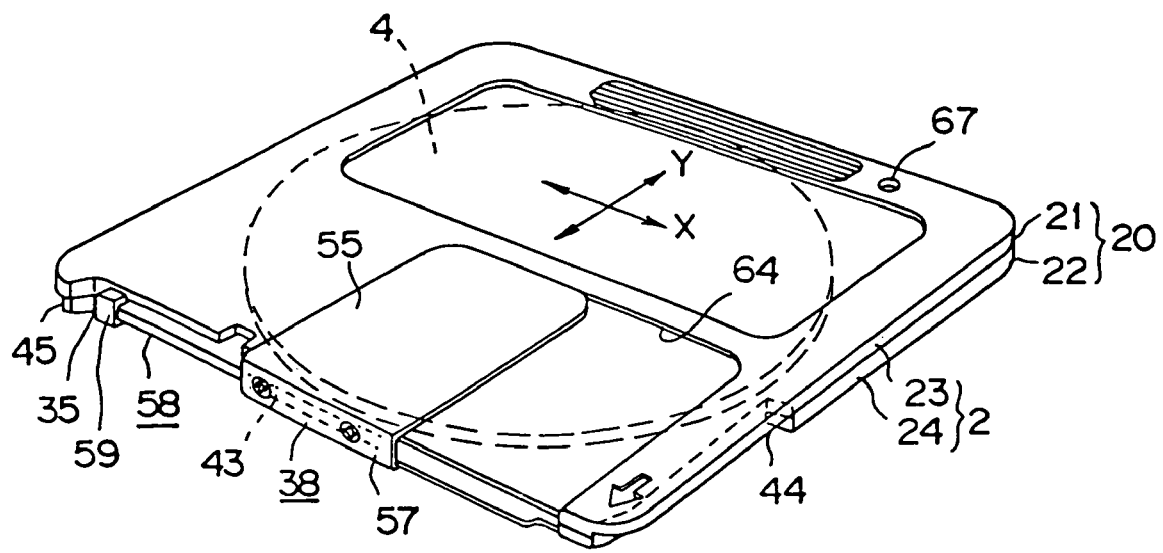
FIG. 3 is a perspective view of a disc cartridge according to the present invention as seen from the upper side.
Figure 4:
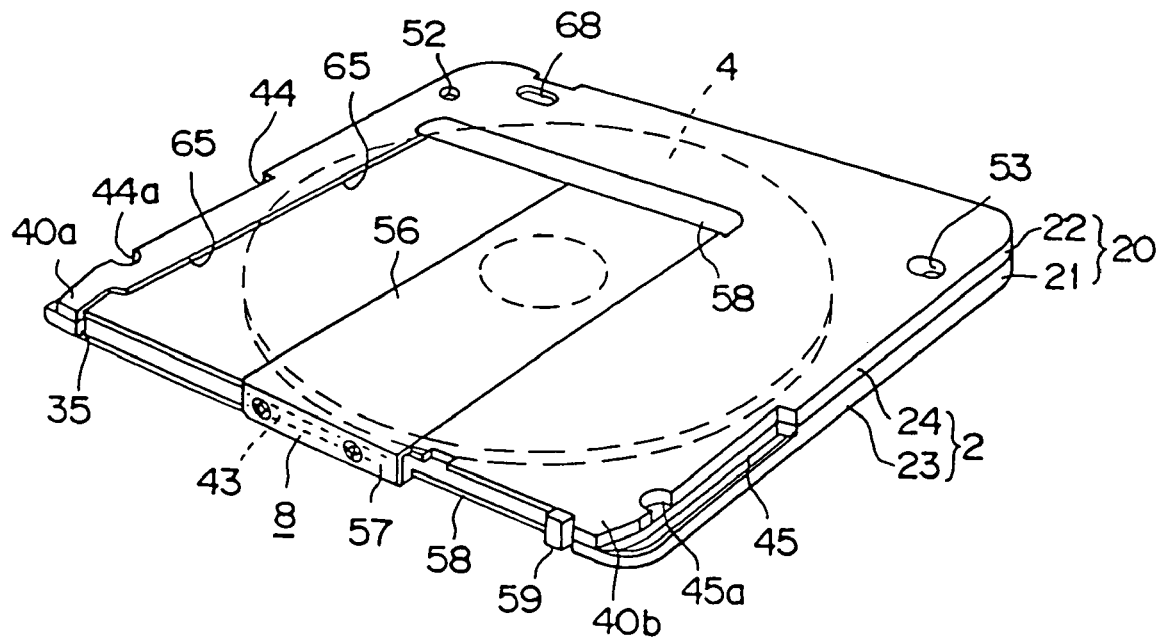
FIG. 4 is a perspective view of the above disc cartridge as seen from the lower side.

A disc cartridge 1 according to the present invention is constituted by providing a cartridge body 20 formed as shown in FIG. 3 and FIG. 4, by mating and joining an upper half 21 and a lower half 22 formed by shaping a plastic material into substantially shallow dish-like rectangles and rotatably accommodating the optical disc 4 in this cartridge body 20.

Figure 5:
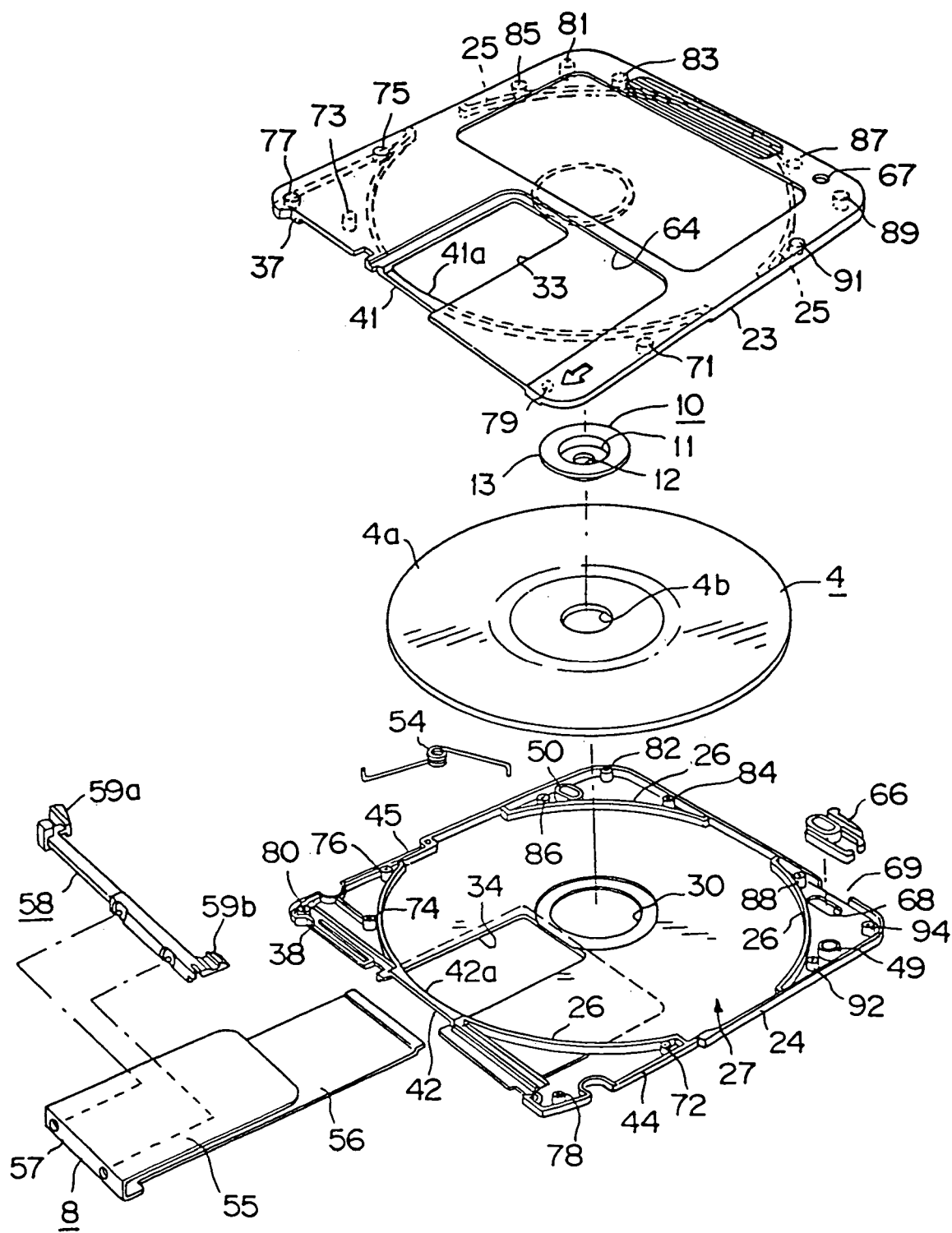
FIG. 5 is a perspective view of disassembled parts of a disc cartridge.

The optical disc 4 accommodated in this disc cartridge 1 is formed to a diameter of 3.5 inch and, as shown in FIG. 5, is constituted by a disc substrate 4a exhibiting a disk-like shape and a hub 10 for magnet clamping attached so as to be fitted in a center hole 4b provided at the center of this disc substrate 4a.

To fabricate this optical disc 4, as is well known, a stamper is prepared by a mastering process including cutting of the original disk. Then, a plastic material having a light transmitting property such as a polycarbonate resin (PC) or polymethyl methacrylate resin (PMMA) is shaped by a die incorporating this stamper so as to form the disc substrate 4a. In this disc substrate 4a, a center hole 4b is provided at the center and, at the same time, concavities and convexities arranged in concentric circles about the center hole 4b corresponding to the control signal and the other data signals formed on the surface of the stamper are transferred to main surface so as to form the data signal recording portion on the main surface on which the data signal recording portion of the disc substrate 4a is formed, a signal recording layer comprising a vertical magnetic recording medium etc. is formed. Then the hub 10 is attached to the position corresponding to the center hole 4b of the disc substrate 4 to thereby complete the optical disc 4. The hub 10 used here is formed by a magnetic material such as a thin metal plate and, as shown in FIG. 5, is constituted by a cylindrical fitting 11 having a bottom and an outer circumferential flange 13 formed flaring out over the entire circumference of the outer circumferential edge of the opening side of this fitting 11. The fitting 11 is formed with an outer diameter almost equal to the diameter of the center hole 4b. Further, in the fitting 11, a spindle engagement hole 12 with which the spindle shaft projected from the disc table of the disc rotating mechanism provided on the recording and reproducing apparatus side on which the optical disc 4 is loaded is provided at the center portion. The hub 10 is attached by joining the outer circumferential flange 13 to the surface of the disc substrate 4a by for example an ultraviolet ray-curable binder in a state where the fitting 11 is fitted in the center hole 4b. At this time, the hub 10 is attached to the disc substrate 4a so as to close the center hole 4b by the fitting 11.

Figure 6:
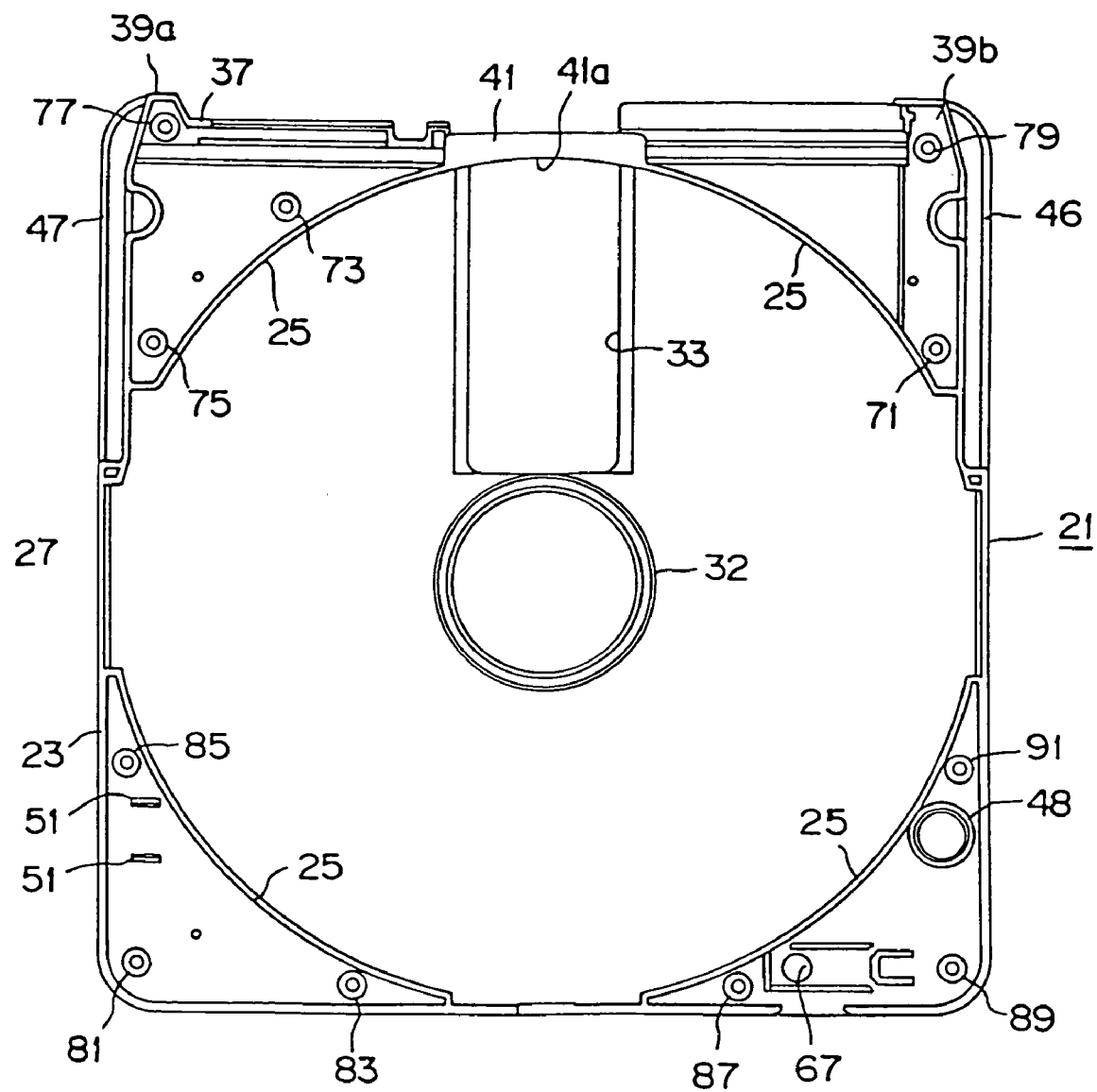
FIG. 6 is a plan view showing the inner surface of the upper half.
Figure 7:
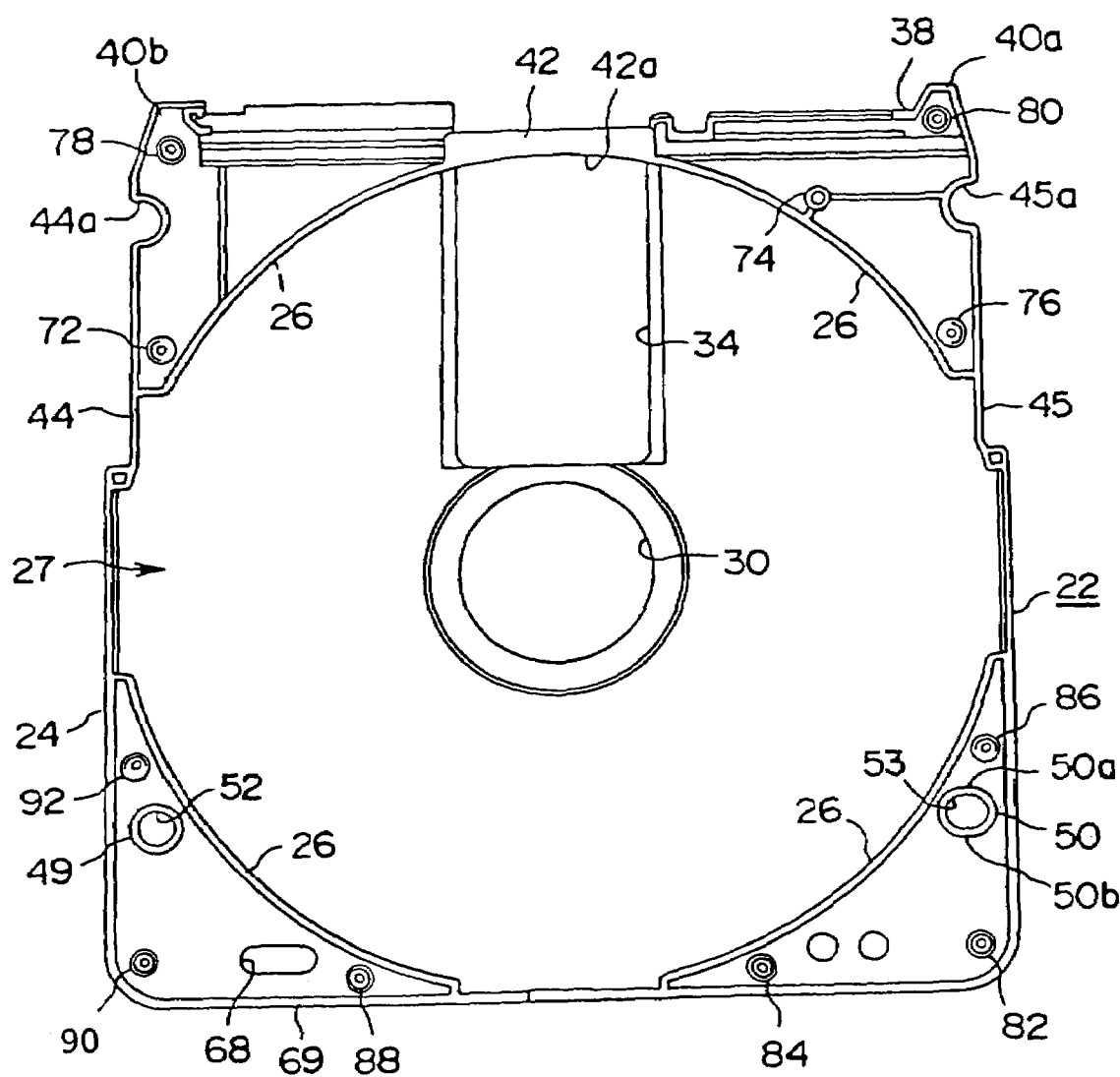
FIG. 7 is a plan view showing the inner surface of the lower half.

The upper half 21 and the lower half 22 of the cartridge body 20, as shown in FIG. 5, FIG. 6, and FIG. 7, are formed with rising circumferential walls 23 and 24 along the circumferential side edges. These rising circumferential walls 23 and 24 constitute the circumferential side wall 2 of the cartridge body 20 when mating and joining the upper and lower halves 21 and 22 as shown in FIG. 3 and FIG. 4 to form the cartridge body 20. Further, at the facing inner surfaces of the upper and lower halves 21 and 22, as shown in FIG. 6 and FIG. 7, disc walls forming the accommodating portion 25 and 26 are projected so as to be inscribed by the rising circumferential walls 23 and 24 which stretch substantially rectangular overall. These disc walls forming the accommodating portion 25 and 26 constitute the disc accommodating portion 27 for accommodating the optical disc 4 in the cartridge body 20 so that it freely rotates when mating and joining the upper and lower halves 21 and 22 to constitute the cartridge body 20. Note that, the disc walls forming the accommodating portion 25 and 26 formed at the upper and lower halves 21 and 22 are constituted as shown in FIG. 6 and FIG. 7 by a plurality of rising walls of an arc shape formed positioned on the same circumference inscribed by the rising circumferential wall 23 and the rising circumferential wall 24, respectively.

Further, in the lower half 22, as shown in FIG. 7, a circular central opening 30 into which the disc table of the disc rotating mechanism arranged on the recording and reproducing apparatus side enters is provided positioned at schematically a center thereof. In this central opening 30, the hub 10 and the circumferential edge of the optical disc 4 accommodated in the cartridge body 20 are made to face outward. When loading the disc cartridge 1 in the recording and reproducing apparatus, the disc table enters via the central opening 30, and the optical disc 4 is placed on this disc table. At this time, the hub 10 is attracted by the magnet arranged on the disc table, whereby the optical disc 4 is chacked on the disc table and becomes able to rotate integrally with this disc table.

On the other hand, at schematically a center of the inner surface of the upper half 21, as shown in FIG. 6, a disc supporting portion 32 for supporting the circumferential edge of the center hole 4b of the optical disc 4 accommodated in the cartridge body 20 is projected. This disc supporting portion 32 is provided at a position facing the central opening 30 provided in the lower half 22 when mating and joining the upper and lower halves 21 and 22 to constitute the cartridge body 20 and is formed in a ring of a size that can support the non-signal recording portion provided at the inner circumferential side of the data signal recording portion of the optical disc 4, that is, the circumferential edge of the center hole 4b. Namely, the disc supporting portion 32 supports the non-signal recording portion of the optical disc 4 so that the signal recording portion does not come into direct contact with the cartridge body 20 when an outer disturbance is added to the disc cartridge 1 and the optical disc 4 is moved in the cartridge body 20.

Further, in the upper half 21 constituting the upper surface of the cartridge body 20 and the lower half 22 constituting the lower surface of the cartridge body, as shown in FIG. 5, FIG. 6 and FIG. 7, openings 33 and 34 for the recording and reproduction making at least one part of the data signal recording portion of the optical disc 4 rotatably accommodated in the disc accommodating portion 27 face outward over the inner and outer circumferences are respectively made facing each other. These openings 33 and 34 are positioned at the center of the cartridge body 2 in the horizontal direction as shown in FIG. 3 and FIG. 4 and are formed so as to exhibit a rectangular shape over an area from a position close to the central opening 30 formed at the center of the lower half 22 and the disc supporting portion 32 formed at the center of the upper half 21 to the front side of the cartridge body 20.

Further, at the front side of the upper half 21 and the lower half 22, as shown in FIG. 5, there are formed concave portions 37 and 38 constituting the shutter member movement portion 35 for movement of the shutter member 8 moveably attached to the cartridge body 20 for opening or closing the openings 33 and 34 for recording and reproduction provided in the cartridge body 20. These concave portions 37 and 38 are formed over the range of movement of the shutter member 35 as shown in FIG. 6 and FIG. 7 and are formed at the centers of the upper and lower halves 21 and 22 away from the two ends.

Note that the shutter opening operation member provided on the recording and reproducing apparatus side enters into the shutter member movement portion 35 formed on the front side of the cartridge body 20 by combining the concave portions 37 and 38 of the upper and lower halves 21 and 22.

As shown in FIG. 6 and FIG. 7, projections 39a and 39b and 40a and 40b are formed at the two ends of the front sides of the upper half 21 and the lower half 22 by forming the concave portions 37 and 38 at the centers.

Further, the front side at the openings 33 and 34 for recording and reproduction formed in the upper half 21 and lower half 22 is closed by the connection pieces 41 and 42 as shown in FIG. 6 and FIG. 7. These connection pieces 41 and 42 are formed while being biased to the mating surface side so as to form a step portion on the outer surface of the upper and lower halves 21 and 22 as shown in FIG. 5. The connection pieces 41 and 42 are mated with each other when the upper and lower halves 21 and 22 are mated and joined, are positioned at the center of the direction of thickness of the cartridge body 20, and constitute the thin portion 43 having a thickness less than that of the cartridge body 20. The two sides of the thin portion 43 constituted positioned at the front side of the openings 33 and 34 for recording and reproduction are used as the portion to and from which the optical pick-up and magnetic head constituting the recording and reproduction means arranged on the recording and reproducing apparatus side advance or retract. By forming this as a thin portion 43 to and from which the optical pick-up and magnetic head advance or retract, it becomes possible to reduce the amount of movement of the optical pick-u and magnetic head with respect to the disc cartridge 1 in the vertical direction and make it face or bring it into sliding contact with the optical disc 4.

Note that, the surfaces 41a and 42a of the inward side of the connection pieces 41 and 42 are formed as arcs corresponding to the outer circumferential edge of the optical disc 4 accommodated in the cartridge body 20 as shown in FIG. 6 and FIG. 7.

At the two sides of the cartridge body 20, as shown in FIG. 3 and FIG. 4, there are provided recess portions, 44 and 45 for preventing erroneous loading positioned at the lower half 22 side from the front side toward the middle toward the back side with which the mechanism for preventing erroneous loading provided at the recording and reproducing apparatus side engages. These recess portions 44 and 45 are formed by cutting the two sides of the lower half 22 as shown in FIG. 7. The portions of the upper half 21, which is mated and joined to the lower half 22 to constitute the cartridge body 20, mating with the recess portions 44 and 45 are formed as projecting pieces 46 and 47 without recessing as shown in FIG. 6. Accordingly, the recess portions 44 and 45 for preventing the erroneous loading provided in the cartridge body 20 are formed as grooves having an L-shaped cross-section opening a portion over an area from the side surface to the lower surface of the cartridge body 20. Here, the recess portions 44 and 45 for preventing the erroneous loading formed on the two sides of the cartridge body 20 are formed with a common length. Further, the recess portions 44 and 45 are provided with concave engagement portions 44a and 45a with which one part of the cartridge loading mechanism provided on the recording and reproducing apparatus side is engaged.

By providing the mechanism for preventing erroneous loading in which the recess portions 44 and 45 as mentioned above are formed and providing engagement portions with which these recess portions 44 and 45 are engaged on the recording and reproducing apparatus side on which this disc cartridge 1 is loaded, it is possible to prevent the loading of another disc cartridge not provided with the recess portions 44 and 45 in the recording and reproducing apparatus in which the disc cartridge 1 according to the present invention is to be loaded.

Further, between the upper half 21 and lower half 22 which are to be mated and joined with each other are provided a first positioning mechanism for positioning the mating positions of the upper and lower halves 21 and 22 in a direction indicated by an arrow X in FIG. 3, that is, a direction parallel to the direction of movement of the shutter member 8, and a second positioning mechanism for positioning the mating positions in a direction indicated by an arrow Y in FIG. 3, that is, the direction orthogonal to the direction of movement of the shutter member 8, when mating and connecting these upper and lower halves 21 and 22. The first and second positioning mechanisms are provided positioned at the corners on the two sides of the back side facing the front side of the cartridge body 20 to which the shutter member 8 is attached. Namely, the first and second positioning mechanisms are provided positioned in a region surrounded by the disc accommodating portion 27 and circumferential side wall 2 constituted in the cartridge body 20.

The first positioning mechanism for positioning the mating positions of the upper and lower halves 21 and 22 in the direction indicated by the arrow X in FIG. 3 is constituted by a pair of first and second cylindrical bodies 48 and 49 which are engaged with each other provided at opposite positions of the upper and lower halves 21 and 22. Here, the first cylindrical body 48 projected at the upper half 21 side is formed so as to have an inner diameter large enough to accommodate the second cylindrical body 49 projected at the lower half half 22 side. By fitting these first and second cylindrical bodies 48 and 49 with each other, when the upper and lower halves 21 and 22 are mated with each other, the mating positions in the direction indicated by the arrow X in FIG. 3, that is, the direction parallel to the direction of movement of the shutter member 8, are determined.

Further, the second positioning mechanism for positioning the mating positions of the upper and lower halves 21 and 22 in the direction indicated by the arrow Y in FIG. 3 is constituted by a cylindrical portion 50 exhibiting a long oval shape projected at the lower half 22 side as shown in FIG. 7 and a pair of parallel projections 51, 51 projected at the upper half 21 side to fit over the two sides of the cylindrical portion 50 as shown in FIG. 6. The cylindrical portion 50 projected at the lower half 22 side is formed in a long oval shape having surfaces 50a and 50b facing to each other parallel to the direction of movement of the shutter member 8, and a pair of parallel projections 51 and 51 projected at the upper half 21 side are formed in parallel to the direction of movement of the shutter member 8. By fitting the cylindrical portion 50 having the surfaces 50a and 50b parallel to the direction of movement of the shutter member 8 between the pair of parallel projections 51 and 51 parallel to the direction of movement of the shutter member 8, the mating positions of the mating upper and lower halves 21 and 22 in the direction indicated by the arrow Y in FIG. 3 are determined by the pair of parallel projections 51 and 51 and the parallel surfaces 50a and 50b of the cylindrical portion 50.

The holes of the second cylindrical body 49 provided in the lower half 22 side and the cylindrical portion 50 of the long oval shape constituting the first and second positioning mechanisms are communicated with the outer surface of the lower half 22. When assembling the disc cartridge 1, they are used as the positioning holes 52 and 53 with which the positioning pins arranged on the recording and reproducing apparatus side are engaged.

On the facing inner surfaces of the upper half 21 and lower half 22 constituting the cartridge body 20 by this mating and connection, as shown in FIG. 6 and FIG. 7, pairs of mating projections 71 to 92 constituting the fusing portions are integrally projected at a plurality of positions. These mating projections 71 to 92 are formed in cylindrical shapes having schematically the same diameter, but the mating projections provided at the upper half 21 are formed with smaller heights than the mating projections provided at the lower half 22. Note that, these mating projections 71 to 92 are formed so that the overall heights in axial direction are substantially equal to the height of the rising circumferential walls 23 and 24 mated with each other when the two halves are mated.

Here, concretely explaining the positions at which the mating projections 71 to 92 provided at the upper half 21 and lower half 22 are formed, the mating projections 71 to 92 are provided in the region surrounded by the rising circumferential walls 23 and 24 constituting the circumferential side wall 2 of the cartridge body 20 and the walls forming the disc accommodating portion 25 and 26 constituting the disc accommodating portion 27 as shown in FIG. 6 and FIG. 7.

In the region surrounded by the rising circumferential walls 23 and 24 constituted at one corner at the front side of the upper half 21 and lower half 22 and the walls forming the disc accommodating portion 25 and 26, a pair of mating projections 71 and 72 are provided. The region of one corner of the front side of the upper half 21 and lower half 22 is used as the region in which a coil spring for biasing the shutter member 8 is to be arranged as will be mentioned later, so the mating projections 28 and 29 are provided positioned at the back side of the upper half 21 and lower half 22 in which the rising circumferential walls 23 and 24 and the walls forming the disc accommodating portion 25 and 26 are in close contact with each other as shown in FIG. 6 and FIG. 7. The positions at which these mating projections 71 and 72 are provided are the positions on the two sides at which the recess portions 44 and 45 for preventing the erroneous loading constituted in the cartridge body 20 are formed as shown in FIG. 7.

Further, in the region surrounded by the rising circumferential walls 23 and 24 and the walls forming the disc accommodating portion 25 and 26 constituted on one corner of the front side of the upper half 21 and lower half 22, two pairs of disc cartridges 73 and 74 and 75 and 76 are provided. One pair of mating projections 73 and 74 of the two pairs of mating projections 73 and 74 and 75 and 76 is provided at the positions on the inward side of the upper half 21 and lower half 22 offset from the rising circumferential walls 23 and 24 to the walls forming the disc accommodating portion 25 and 26 side as shown in FIG. 6 and FIG. 7. The other mating projections 75 and 76 are provided at positions at the back side of the upper half 21 and lower half 22 at which the rising circumferential walls 23 and 24 and the walls forming the disc accommodating portion 25 and 26 approach each other and at the two sides where the recess portions 44 and 45 for preventing the erroneous loading are formed.

Further, in the region of the projections 39a and 39b and 40a and 40b projected at the two sides of the front side of the upper half 21 and lower half 22, pairs of projections 77 and 78 and 79 and 80 are formed.

In the region surrounded by the rising circumferential walls 23 and 24 and the walls forming the disc accommodating portion 25 and 26 constituted on each corner of the back sides of the upper half 21 and lower half 22, three pairs each of mating projections 81 and 82; 83 and 84; and 85 and 86 and 87 and 88; 89 and 90; and 91 and 92 are provided. Each pair of mating projections 81 and 82 and 89 and 90 in each region is provided positioned at each corner on the back side of the upper half 21 and lower half 22 as shown in FIG. 6 and FIG. 7, while each other pair of mating projections 83 and 84 and 87 and 88 is provided at a position at the back side at which the rising circumferential walls 23 and 24 and the walls forming the disc accommodating portion 25 and 26 approach each other. Further, the pair of mating projections 85 and 86 provided in the region on one corner of the back side of the upper half 21 and lower half 22 is provided at a position close to a pair of parallel projections 51 and 51 and cylindrical portion 50 constituting the second positioning mechanism. Furthermore, the pair of mating projections 91 and 92 provided in the region of one corner of the back side of the upper half 21 and lower half 22 is provided close to the first and second cylindrical bodies 48 and 49 constituting the first positioning mechanism.

Figure 8:
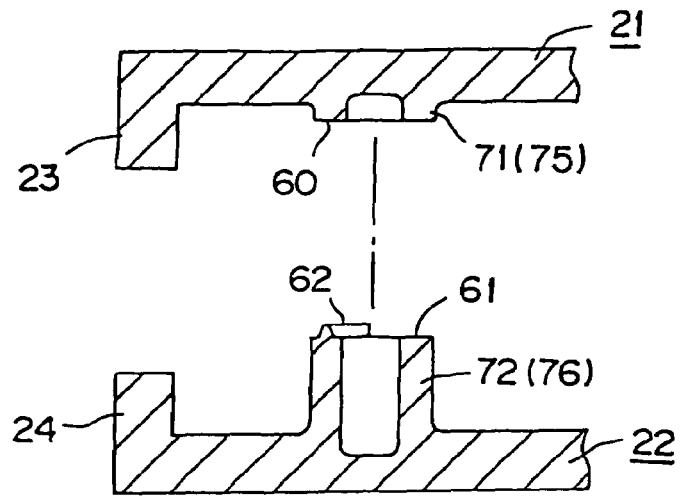
FIG. 8 is a vertical sectional view showing a fusing portion for joining the upper half and the lower half of the cartridge body.
Figure 9:
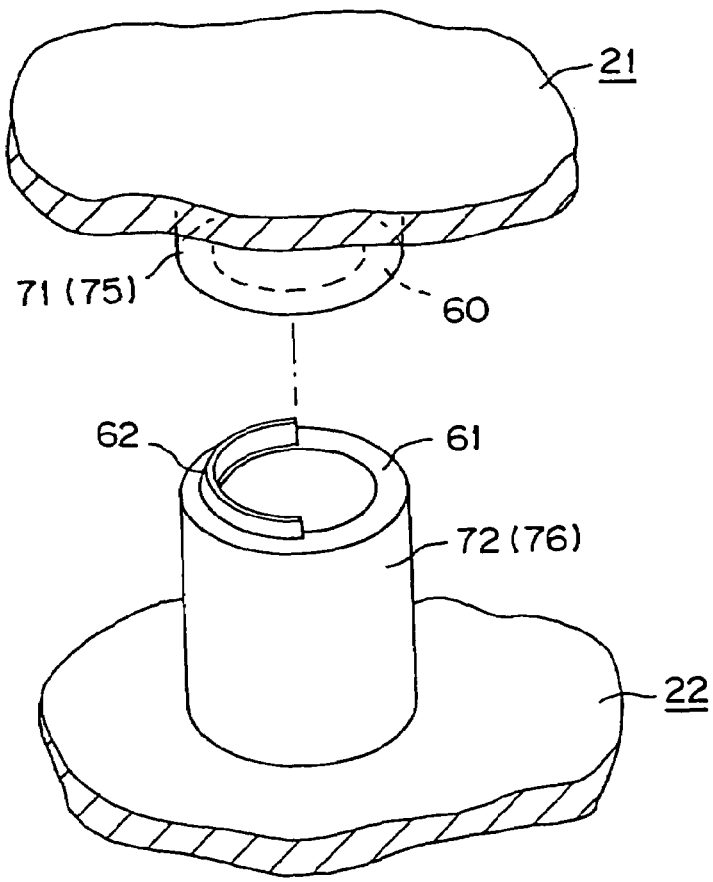
FIG. 9 is a perspective view showing a mating projection constituting the fusing portion.

The mating projections 71, 73, 75, 77, 79, 81, 83, 85, 87, 89 and 91 formed on the upper half 21 are formed in cylindrical shapes with flat end surfaces 60 on the mating surfaces surface side as shown in FIG. 8 and FIG. 9.

On the other hand, among the mating projections formed on the lower half 22, the end surfaces 61 of the mating surface side of the mating projections 72 and 76 which are in the regions surrounded by the rising circumferential wall 24 and the walls forming the disc accommodating portion 26 constituted at the corners of the front side and which are provided on the two sides where the recess portions 44 and 45 for preventing erroneous loading positioned at the back side at which the rising circumferential wall 24 and the walls forming the disc accommodating portion 25 approach each other are former, as shown in FIG. 8 and FIG. 9, projections 62 for fusing are formed exhibiting a semi-arc shape and with a thickness narrower toward the tip end. At this time, the projections 62 are formed at positions on the rising circumferential wall 24 side.

Figure 10:
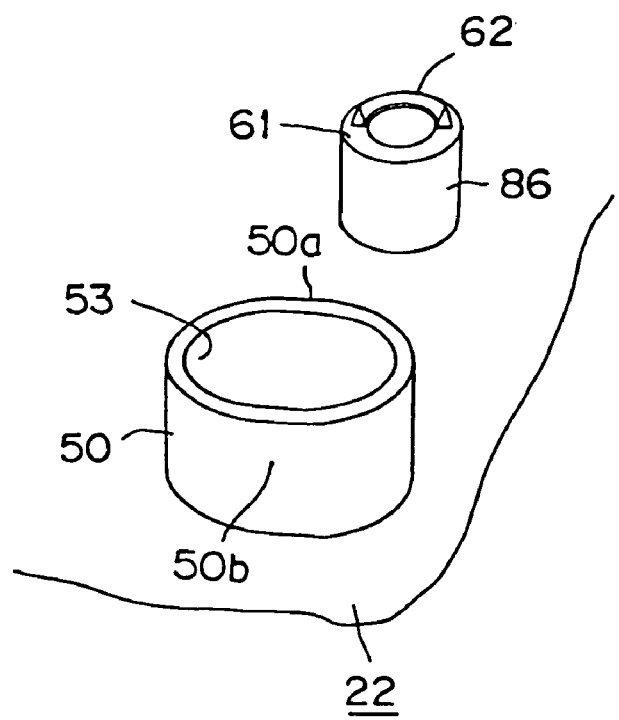
FIG. 10 is a perspective view showing a mating projection provided in the vicinity of a cylindrical portion provided on the lower half side constituting a second positioning mechanism for positioning of the mating projections of the upper and lower halves.
Figure 11:
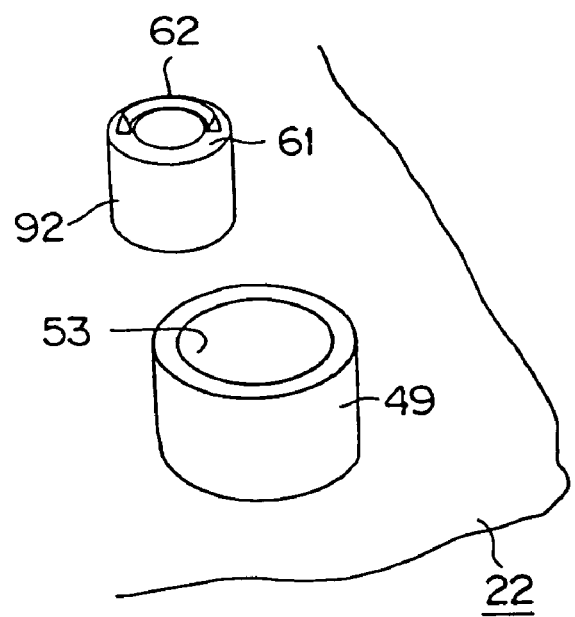
FIG. 11 is a perspective view showing the mating projection provided in the vicinity of a second cylindrical body provided on the lower half side constituting a first positioning mechanism for positioning of the mating projections of the upper and lower halves.

Further, on the end surfaces 61 of the mating projections 86 and 92 provided in the vicinity of the cylindrical portion 50 and the second cylindrical body 49 constituting the first and second positioning mechanisms formed on the lower half 22 as shown in FIG. 10 and FIG. 11 are formed projections 62 for fusing exhibiting a semi-arc shape and having a thickness narrower toward the tip end. At this time, the projections 62 are formed along the end surfaces 61 opposite to the cylindrical portion 50 and the second cylindrical body 49.

Figure 12:
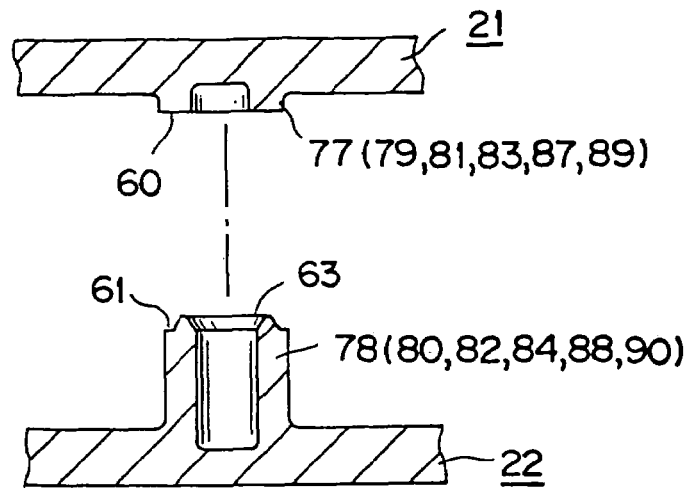
FIG. 12 is a vertical sectional view showing the mating projections constituting another fusing portion provided at the upper and lower halves.
Figure 13:
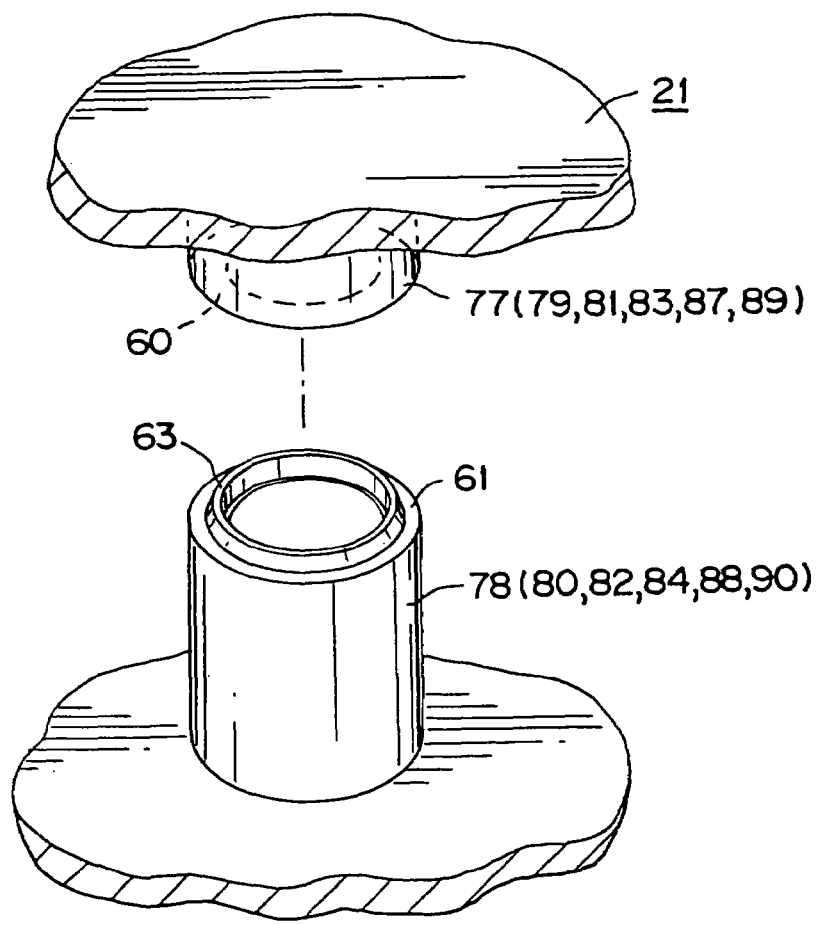
FIG. 13 is a perspective view showing the mating projection constituting the fusing portion.

On the other hand, the end surfaces 61 of the mating surface side of the other mating projections 78, 80, 82, 84, 88, and 90 provided on the lower half 22, as shown in FIG. 12 and FIG. 13, are formed with projections 63 for fusing formed in ring shapes which continue successively over the entire circumference of the end surfaces 61. These projections 63 also have a thickness which becomes smaller toward the tip ends.

Here, the reason why the projections 62 to be formed on the end surfaces 61 of the mating projections 72 and 76 provided in the vicinity of the position at which the mating rising circumferential walls 23 and 24 and the walls forming the disc accommodating portion 25 and 26 approach each other and the mating projections 86 and 92 provided in the vicinity of the cylindrical portion 50 and the second cylindrical body 49 constituting the first and second positioning mechanisms to be mated and joined to each other are formed in the semi-arc shape is so that, when the ultrasonic wave is applied, the portions of these mating projections 72 and 76 and 86 and 92 will not vibrate much in comparison with the portions of the other mating projections 78, 80, 82, 84, 88 and 90. Namely, vibration is inhibited due to the fact that portions where the upper and lower halves 21 and 22 mate and engage such as the first and second positioning mechanisms exist nearby, so sufficient vibration is not generated. Therefore, so as to enable sufficient melting even by a little vibration, the projections 62 to be provided at the mating projections 72 and 76 and 86 and 92 are formed in the semi-arc so as to reduce the amount of the melting. These projections 62 are desirably provided at positions of the upper and lower halves 21 and 22 which are farthest from the mating and engaging portions as mucky as possible so that they can sufficiently vibrate by the application of the ultrasonic waves. For this reason, the projections 62 to be provided at the mating projections 72 and 76 and 86 and 92 are provided at positions away from the mating portions of the upper and lower halves 21 and 22 as mentioned above. Note that, it is sufficient so far as the projections 62 to be provided at the mating projections 72 and 76 and 86 and 92 are formed so that they can be reliably melted with little vibration and can be constituted by a plurality of fine projections-provided on the end surfaces 61 too.

So as to mate and join the upper half 21 and lower half 22 constituted as mentioned above to assemble the cartridge body 20, the first and second cylindrical bodies 48 and 49 constituting the first positioning mechanism are fitted with each other and, at the same time, the cylindrical portion 50 exhibiting the long oval shape is fitted between the pair of parallel projections 51 and 51 constituting the second positioning mechanism so that the upper and lower halves 21 and 22 are mated to each other. By mating them in this way, the upper half 21 and lower half 22 are combined while positioned in the direction indicated by the arrow X in FIG. 3 and the direction indicated by the arrow Y in FIG. 3, that is, in directions orthogonal to each other. At this time, the mating projections 71 to 92 provided at the upper and lower halves 21 and 22 are mated to each other and further also the rising circumferential walls 23 and 24 and the walls forming the disc accommodating portion 25 and 26 are mated to each other.

As mentioned above, the upper and lower halves 21 and 22 are placed on an ultrasonic welding device in a state assembled with each other, the phone for applying an ultrasonic wave to the upper half 21 is pressed against them, and the ultrasonic wave is applied. When the ultrasonic wave is applied, it concentrates at the projections 62 and 63 formed on the end surfaces 60 and 61 of the mating projections 71 to 92 which are made to abut against each other and so these projections 62 and 63 and the circumferential edges thereof are vibrated by the ultrasonic wave. By this ultrasonic vibration, the projections 62 and 63 generate heat and melt. When the application of the ultrasonic wave is suspended, the molten plastic of the mating projections 62 and 63 resolidify to fuse togther the end surfaces 60 and 61 of the mating projections 71 to 92.

As mentioned above, the shape of the projections 62 and 63 is selected so the projections 62 and 63 are substantially uniformly melted in consideration of the fact that the state of vibration when the ultrasonic wave is applied differs depending upon the position at which the mating projections 71 to 92 are provided. Accordingly, since it is possible to melt the projections 62 and 63 in a short time and fuse together the mating projections 71 to 92, it is possible to prevent the phone of the ultrasonic welding device from being kept in contact with the outer surface of the upper half 21 for a long time and thus possible to prevented the fine pebbling applied to the surface of the upper half 21 from being damaged and smoothed.

Further, by shortening the time of application of the ultrasonic wave, it is possible to prevent the problem of the optical disc 4 accommodated in the cartridge body 20 vigorously vibrating in the disc accommodating portion 27 and the surfaces rubbing together to cause the walls forming the disc accommodating portion 25 and 26 to be shaved and shaving powder generated and adhering to the surface of the optical disc 4.

Further, since-the fusing is carried out at the corners on the front side and back side of the upper half 21 and lower half 22, the halves are reliably joined. Particularly, in the cartridge body 20 of the present embodiment, the two sides at which the recess portions 44 and 45 for preventing erroneous loading are fused together, so even if the erroneous loading preventing members on the recording and reproducing apparatus side which were supposed to engage are engaged with these recess portions 44 and 45 with a force trying to push open the upper and lower halves 21 and 22, the upper and lower halves 21 and 22 will not easily separate and the joined state will be reliably maintained.

As mentioned above, the cartridge body 20 constituted by joining the upper half 21 and lower half 22 by the ultrasonic welding, as shown in FIG. 3 and FIG. 4, has attached to it a shutter member 8 for opening and closing the openings 33 and 34 for recording and reproduction. This shutter member 8 is provided for the purpose of closing the openings 33 and 34 as shown in FIG. 3 and FIG. 4 at the non-use state when the disc cartridge 1 is not loaded in the recording and reproducing apparatus so as to prevent dust etc. from entering into the cartridge body 20 and being adhered to the surface of the optical disc 4 via these openings 33 and 34 and thereby protect the optical disc 4.

This shutter member 8 is formed by pressing a thin metal plate and, as shown in FIG. 5, comprises a first shutter portion 55 and a second shutter portion 56 having outer shapes large enough to close the openings 33 and 34 for recording and reproduction, respectively, and a connection piece 57 joining the base end portions of these first shutter portion 55 and second shutter portion 56, and is formed in substantially a squared U-shape as a whole. The first shutter portion 55 is formed in a rectangular shape slightly long in the front and back direction and having a size large enough to open or close the opening 33 for the recording and reproduction on the upper half 21. Further, the second shutter portion 56 is formed with a size large enough to close the central opening 30 together with the opening 34 for recording and reproduction on the lower half 22 and is formed in a rectangular shape further longer in the front and back direction than the first shutter portion 55. The front end of this second shutter portion 56 is supported by the shutter holding plate 58 which is attached to the main surface of the outward side of the lower half 22 and which prevents the second shutter portion 56 from floating up from the lower half 22. Further, the connection piece 57 of the shutter member 8 is formed so as to have a height substantially equal to the thickness of the front surface of the cartridge body 20.

In the shutter member 8, a slide member 58 is attached to the inside surface of this connection piece 57, and the shutter member 8 is attached to the cartridge body 20 via this slide member 58. This slide member 58 is a member shaped in substantially a rod-like shape by a plastic material as shown in FIG. 5 and has a length substantially twice the width of the connection piece 57 of the shutter member 8. In the slide member 58, portions 59a and 59b for engagement with the cartridge body 20 are provided at the two ends. By an engagement of these engagement portions 59a and 59b in the slide guide groove formed in the shutter member movement portion 35 constituted on the front surface of the cartridge body 20, the slide member 58 moves along the slide guide groove. By the movement of the slide member 58 along the slide guide groove, the shutter member 8 attached to this slide member 58 is moved in a direction opening and closing the openings 33 and 34 for recording and reproduction.

The shutter member 8 is constantly biased in a direction closing the openings 33 and 34 for the recording and reproduction by the coil spring 54 arranged in the cartridge body 20. The coil spring 54 is arranged in the region surrounded by the circumferential side wall 2 and the disc accommodating portion 27 constituted at one corner at the front side of the cartridge body 20 in a state with the two end portions are compressed and the elastic force given. It is arranged in the cartridge body 20 by engaging a tip of one arm with the slide member 58 and, at the same time, engaging the tip of the other arm with the mating projection 72 provided at the lower half 22.

On the main surface of the outward side of the upper half 21 and lower half 22 of the cartridge body 20, as shown in FIG. 3 and FIG. 4, concave portions 64 and 65 for the shutter slide having almost equal depths as the plate thickness of the first shutter portion 55 and the second shutter portion 56 are provided over an area from the region covering the circumferential edges of the opening 33 for recording and reproduction and the opening 34 for recording and reproduction in which the first shutter portion 55 and the second shutter portion 56 of the shutter member 8 move to a region of the front side of the cartridge body 20. These concave portions 64 and 65 enable the installation of the shutter member 8 so that the first shutter portion 55 and the second shutter portion 56 thereof are on the same plane as the outer surface of the cartridge body 20. Accordingly, the thickness dimension of the disc cartridge 1 is not increased even if the shutter member 8 is installed in the cartridge body 20.

The disc cartridge 1 is provided with a mechanism for preventing erroneous recording which prevents erroneous erasing of the data signal recorded on the optical disc 4. This mechanism for preventing erroneous recording is constituted as shown in FIG. 5 by an erroneous recording preventing member 66 which is arranged at a position at one corner of the back side corresponding to the one corner of the front side in which the coil spring 54 of the lower half 22 is arranged and by an erroneous recording detection hole 67 provided in the upper half 21.

The erroneous recording preventing member 66 is moved along the guide hole 68 provided in the lower half 22. At the same time, an operating portion faces the operating opening 69 formed by cutting one part of the rising circumferential wall 23 and rising circumferential wall 24 of the back side of the upper half 21 and lower half 22. The erroneous recording preventing member 66 operates the operating portion from the operating opening 69 to switch between the first position for closing the erroneous recording detection hole 67 and the second position for opening this erroneous recording detection hole 67. The erroneous recording preventing member 66, when set at the first position for closing the erroneous recording detection hole 67, prevents the entry of the erroneous recording detection means provided on the recording and reproducing apparatus side into the erroneous recording detection hole 67 and makes recording of the data signal with respect to the optical disc 4 possible. Further, when set at the second position for opening the erroneous recording detection hole 67, the erroneous recording preventing member 66 allows the entry of the erroneous recording detection means provided on the recording and reproducing apparatus side into the erroneous recording detection hole 67 and makes recording of the data signal with respect to the optical disc 4 impossible.

When the disc cartridge 1 constituted as mentioned above is inserted into the cartridge loading portion of the recording and reproducing apparatus, the shutter member 8 is moved to the position for opening the openings 33 and 34 for recording and reproduction by the shutter opening member on the recording and reproducing apparatus side. At this time, also the central opening 30 is opened.

Further, when the disc cartridge 1 is inserted into the cartridge loading portion of the recording and reproducing apparatus, the disc table on the recording and reproducing apparatus side enters from the central opening 30 into the internal portion. On this disc table is provided a magnet. The hub 10 of the optical disc 4 is attracted in a state where the disc table enters from the central opening 30 to the internal portion of the disc cartridge 1, thereby to perform magnet chacking of the optical disc 4. Further, the disc table is attached to the spindle shaft driven to rotate by the spindle motor. This spindle shaft is inserted into a spindle shaft insertion hole 12 formed in the hub 10 of the optical disc 4 chacked on the disc table.

In the disc cartridge 1, the optical pick-up on the recording and reproducing apparatus side is positioned in the opening 4 for recording and reproduction of the lower half 22 side opened when the shutter member 8 performs the sliding operation corresponding to this. At the same time, an external magnetic field generating device is positioned in the opening 3 for the recording and reproduction on the upper half 21 side corresponding to this. The recording operation or the reproduction operation is carried out to or from the disc cartridge 1 at the-recording and reproducing apparatus side, whereby when the spindle motor is activated and the spindle shaft is driven, the optical disc 4 is driven to rotate at a high speed.

The optical pick-up emits a laser beam to the data signal recording portion of the optical disc 4 which is being driven to rotate and performs processing for the reproduction of the data signal recorded on this data signal recording portion by a well known reproduction process. Further, the external magnetic field generation device performs processing for recording a desired data signal in this data signal recording portion by a well known recording process in a state where the laser beam emitted from the optical pick-up is emitted to the data signal recording portion of the optical disc 4.

Further, while the above-mentioned disc cartridge 1 accommodated an optical disc 4 which enabled the recording and reproduction of a data signal, it is also possible to accommodate an optical disc used only for reproduction. In the disc cartridge 1 accommodating an optical disc used only for reproduction, the opening for recording and reproduction which is provided on the upper half 21 side becomes unnecessary and that side is closed.

Further, the recording medium accommodated in the cartridge body 20 is not restricted to an optical disc and can be any medium so far as it is a disk-like recording medium in which a data signal is recorded, for example, a magnetic disc.

Next, another embodiment of the disc cartridge 2 according to the presentinvention will be explained by referring to FIG. 14, FIG. 15, and FIG. 16. This disc cartridge 2 has a principal portion of the same configuration as that of the disc cartridge 1, so the same reference numerals will be given to common portions and detailed explanations will be omitted. An explanation is made only by explaining the different portions.

Figure 14:
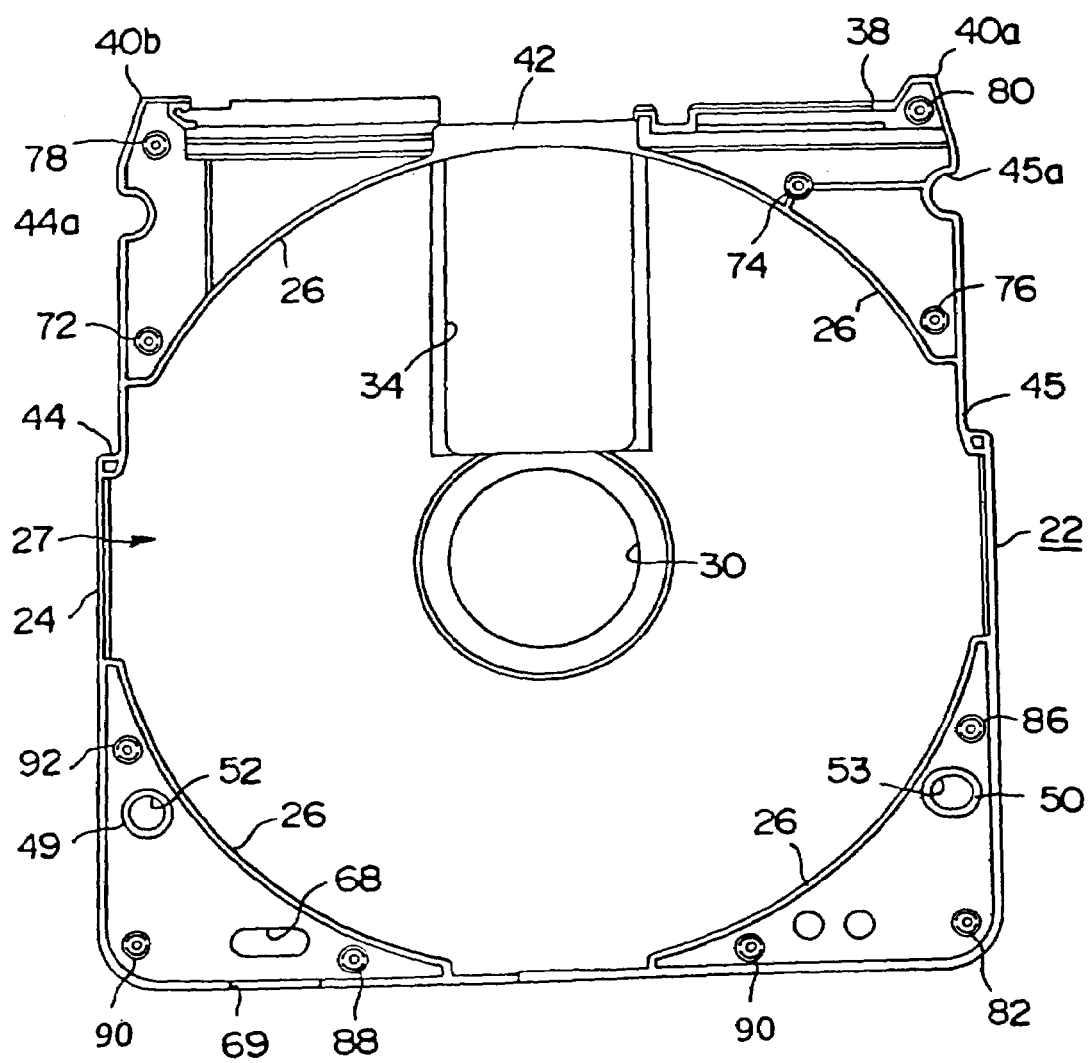
FIG. 14 is a plan view of the inner surface showing another example of the lower half of the cartridge body.
Figure 15:
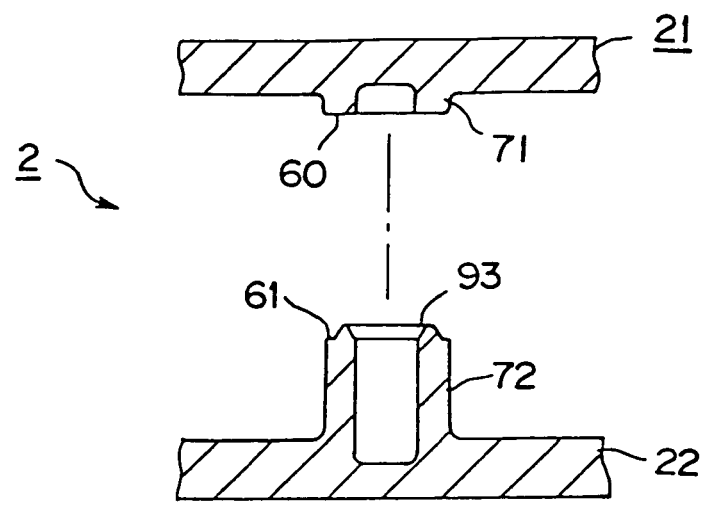
FIG. 15 is a vertical sectional view showing the mating projection constituting a fusing portion provided at the lower half shown in FIG. 14.

This disc cartridge 2 has a different structure of the mating projections 72, 74, 76, 78, 80, 82, 84, 86, 88, 90, and 92 provided on the lower half 22 as shown in FIG. 14. Namely, it has a different structure for the projections 93 for fusing to be formed on the end surfaces 61 of the mating projections 72, 74, 76, 78, 80, 82, 84, 86, 88, 90, and 92. Further concretely explaining one of these mating projections by referring to FIG. 15 and FIG. 16, a projection 93 for fusing exhibiting a discontinuous annular shape comprising the first arc projection 93a and the second arc projection, 93b having lengths covering substantially half the circumference of the end surface 61 and formed so as to face each other is provided on the end surface 61 of this mating projection 72.

Figure 16:
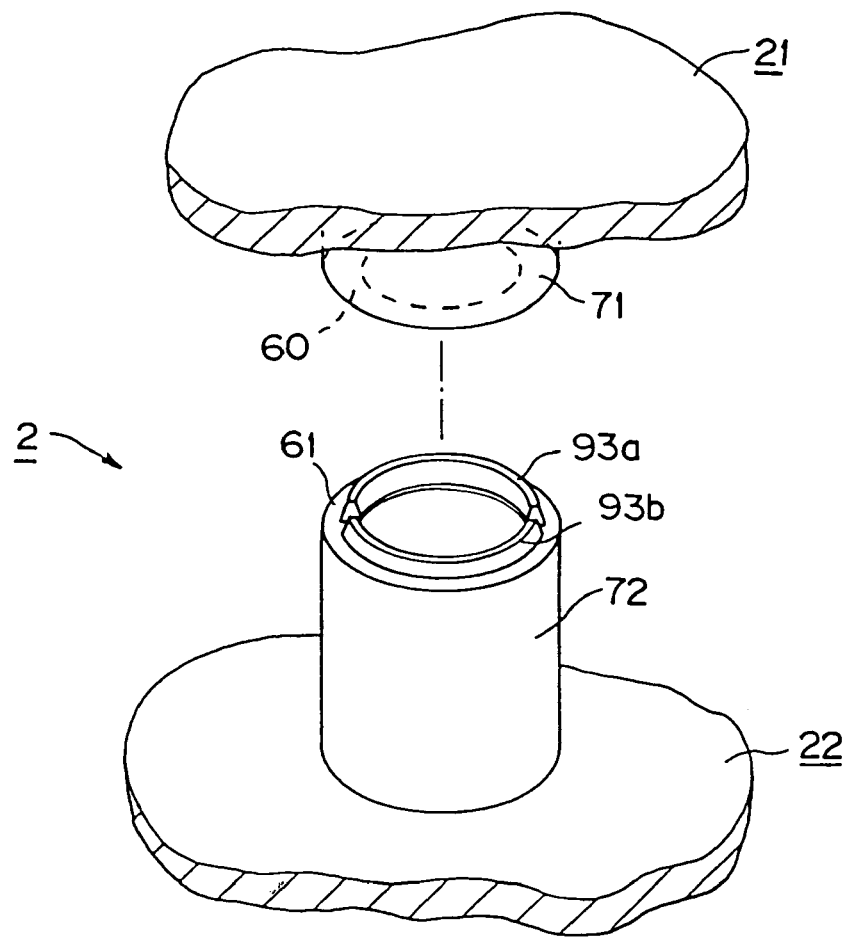
FIG. 16 is a perspective view showing the mating projection constituting a fusing portion.

The first and second arc projections 93a and 93b constituting this projection 93 are formed as small projections in which, as shown in FIG. 16, the cross-section of the portion with the end surface 61 side as a bottom and the top edge as the top point is given substantially a triangular shape.

According to the above disc cartridge 2, due to the formation of the projections 93 for fusing which exhibit the discontinuous annular shape, which can be melted in a short time for joining and fixing the halves and, at the same time, form strong joins, on the end surfaces 61 of the mating projections 72, 74, 76, 78,-,80, 82, 84, 86, 88, 90, and 92 provided in the lower half 22, it is possible to shorten the time for the ultrasonic welding and reduce the amount of the electric power consumed.

Further, various combinations of the mating projections 72, 74, 76, 78, 80, 82, 84, 86, 88, 90, and 92 provided in the lower half 22 may be adopted in accordance with the positions of arrangement.

Figure 17:
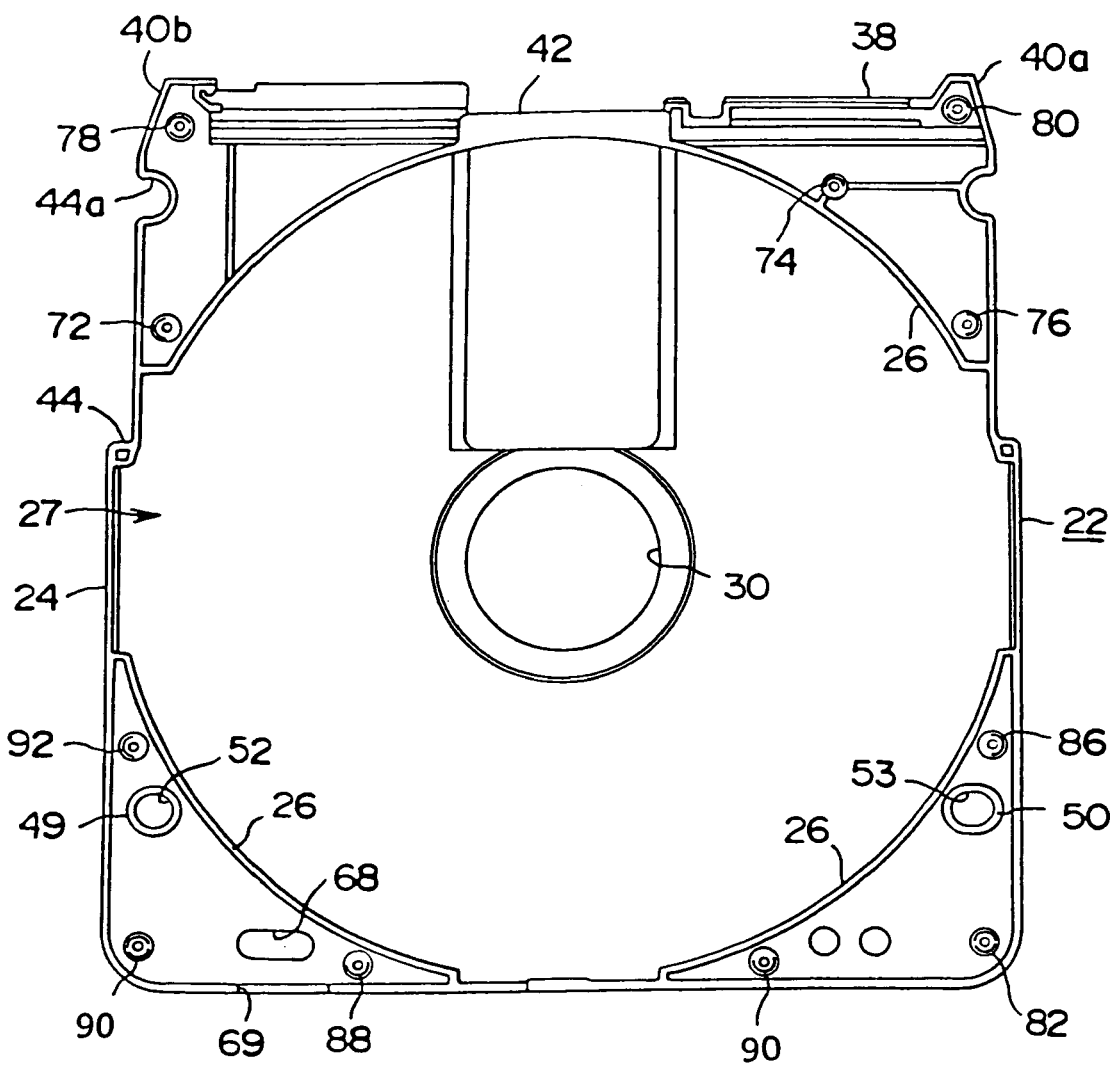
FIG. 17 is a plan view of the inner surface side showing still another example of the lower half of the cartridge body.
Figure 18:
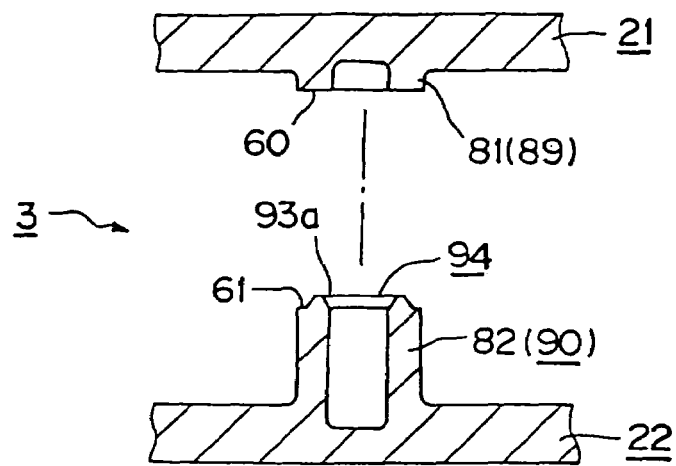
FIG. 18 is a vertical sectional view showing a mating projection constituting a fusing portion provided at the lower half shown in FIG. 17.
Figure 19:
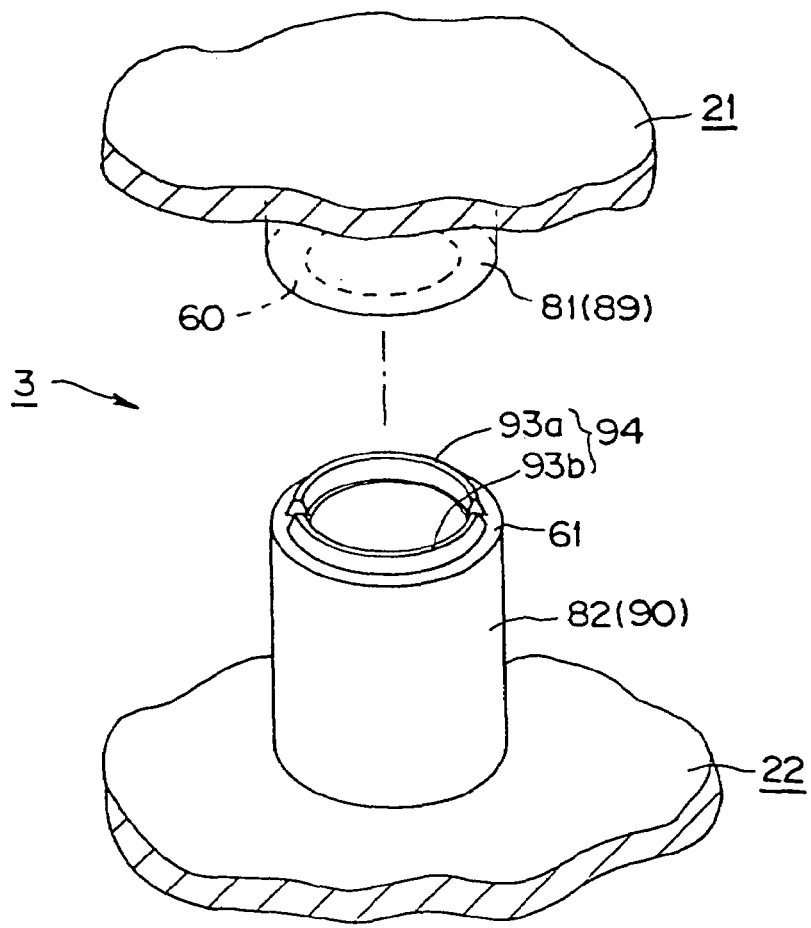
FIG. 19 is a perspective view showing a mating projection constituting a fusing portion.
Figure 20:
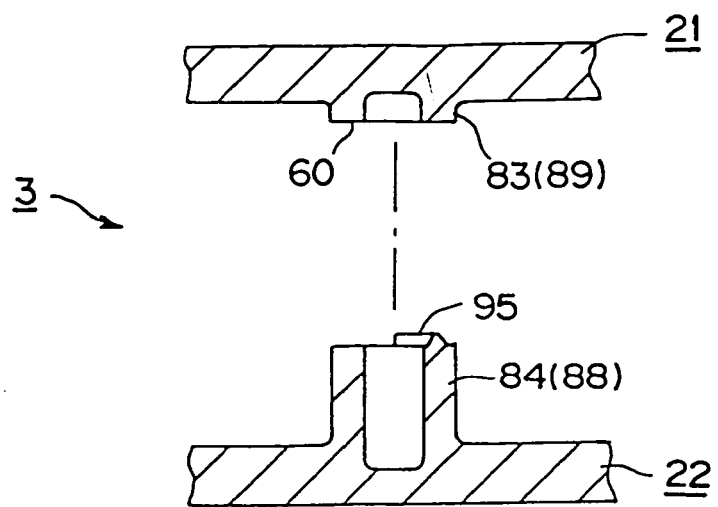
FIG. 20 is a vertically sectional view showing another mating projection constituting a fusing portion provided at the lower half shown in FIG. 17.
Figure 21:
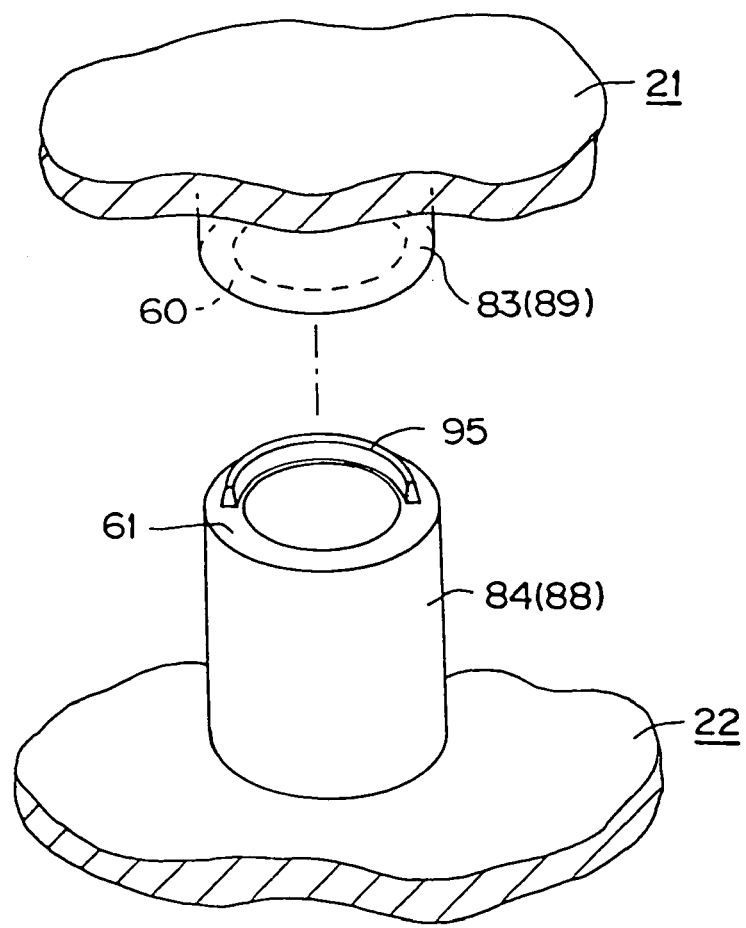
FIG. 21 is a perspective view showing a mating projection constituting a fusing portion.
Figure 22:
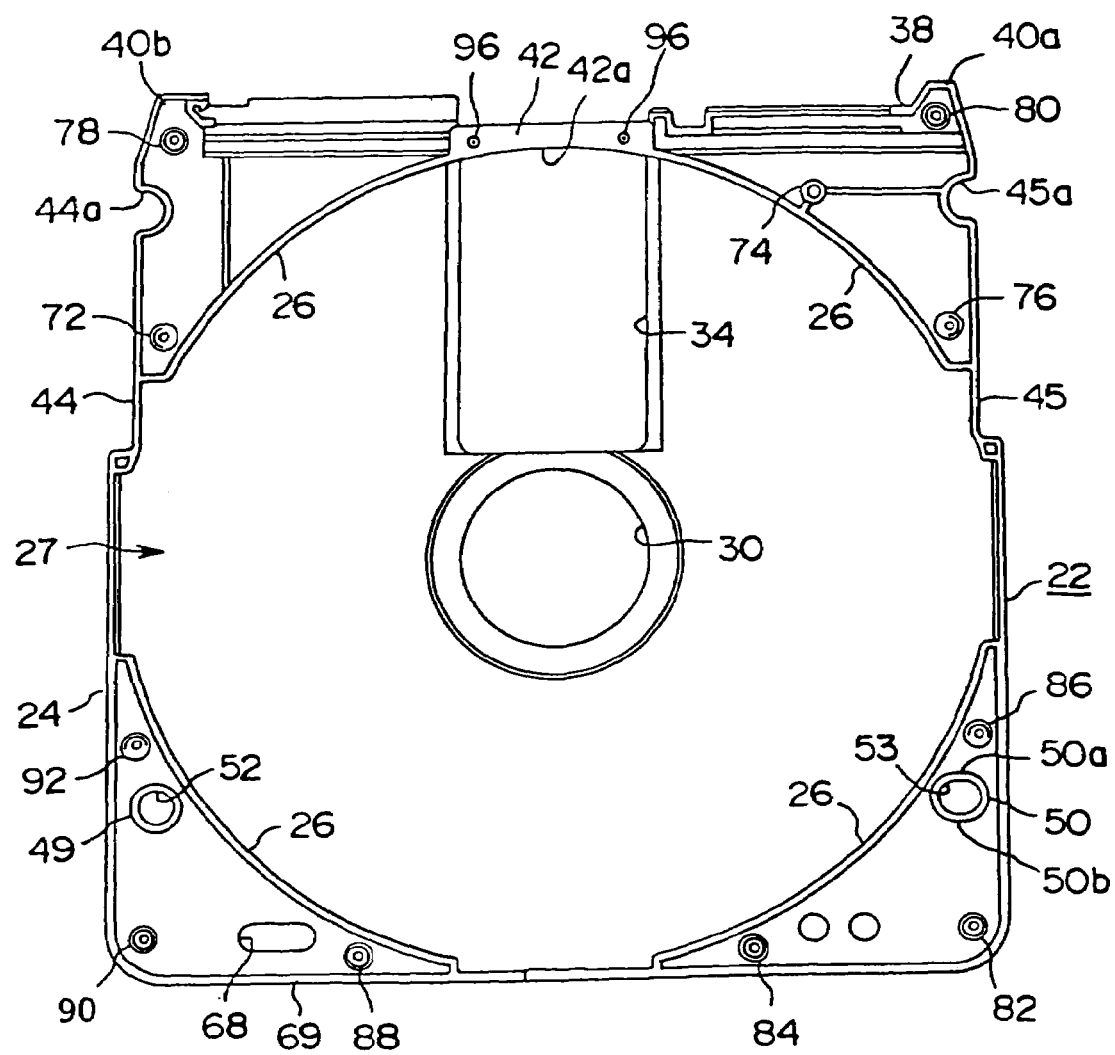
FIG. 22 is a plan view showing the inner surface of the lower half at which a mating projection constituting a fusing portion for fusing connection pieces constituting a thin portion of the cartridge body is provided.
Figure 23:
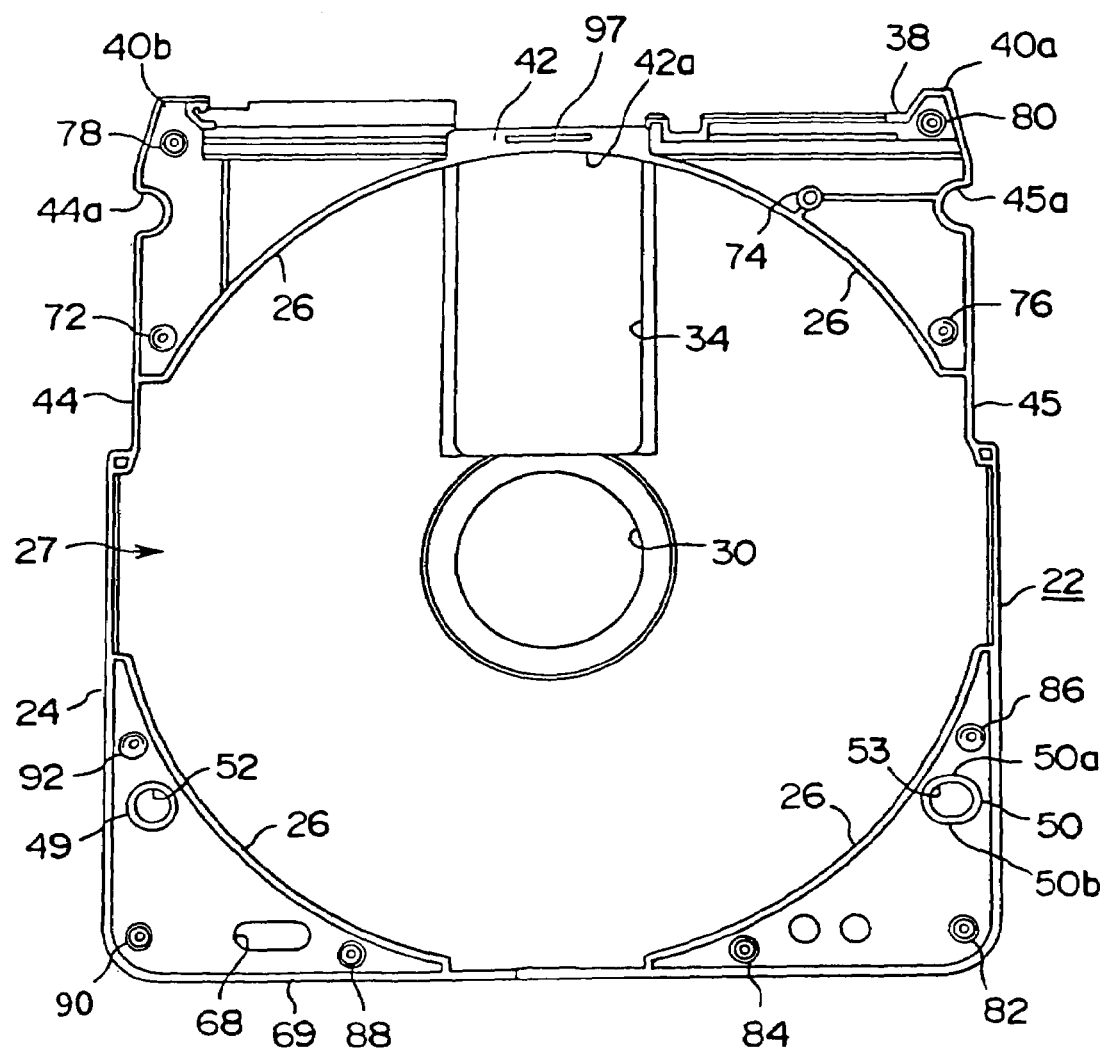
FIG. 23 is a plan view showing the inner surface of the lower half showing another example of a fusing portion for fusing the connection pieces.
Figure 24:
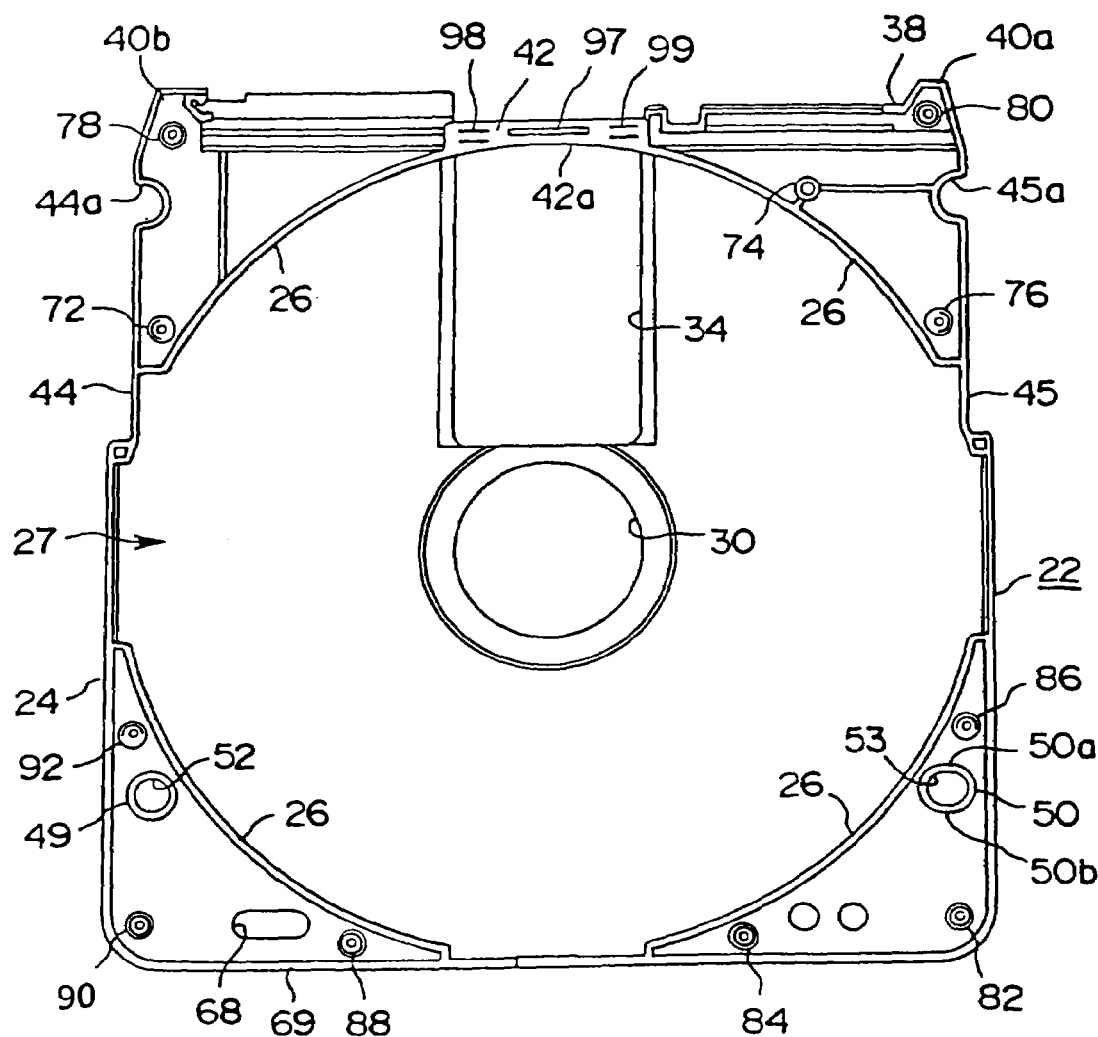
FIG. 24 is a plan view showing the inner surface of the lower half showing still another example of a fusing portion fusing connection pieces.

In the disc cartridge 3 of the present embodiment, the projections 94 for fusing to be formed on the end surfaces 61 of the mating projections 82 and 90 provided at positions close to the corners among the mating projections 82, 84, 86, and 88, 90, and 92 arranged in the regions surrounded by the rising circumferential walls 23 and 24 and the walls forming the disc accommodating portion 25 and 26 constituted at the two corners of the back side of the lower half 22 are formed as shown in FIG. 17, FIG. 18, and FIG. 19. The projections 94 for fusing are formed in a discontinuous annular shape by forming the first projection 93a in the form of an arc and the second projection 93b in the form o-f an arc so as to face each other. The projections 94 are also formed as small projections having a thickness smaller toward the tips with a substantially triangular cross-section of the portion with the end surface 61 side as the bottom and the top edge as the top point as shown in FIG. 18.

Further, the projections 95 for fusing formed on the end surfaces 61 of the mating projections 84 and 88 provided at the positions at which the rising circumferential walls 23 and 24 and the walls forming the disc accommodating portion 25 and 26 on the accommodated in the cartridge body is achieved. Further, since the application time of the ultrasonic wave can be made short, it is possible to prevent the damage of the cartridge body and further the damage of the disk-like recording medium accommodated in the cartridge body.

What is claimed is:

1. A disc cartridge comprising:
    a disc recording medium in which a data signal is recorded;
    a cartridge body exhibiting a rectangular shape formed by mating and joining upper and lower halves at circumferential edges of which are formed rising circumferential walls which are mated to each other to constitute circumferential side walls and accommodating portion walls which are mated to each other at mating inner surfaces to constitute a recording medium accommodating portion in which the disc recording medium is accommodated, the circumferential side walls connecting with the accommodating portion walls in a connecting area;
    an opening for recording and reproduction which is formed in upper and lower surfaces of the cartridge body over an area from the vicinity of the center of the cartridge body to a front side of the cartridge body;
    a shutter member which is provided with a shutter portion for opening or closing the opening and which is attached to the cartridge body so that it can move along a front surface of the cartridge body;
    recess portions for preventing erroneous loading formed on both sides of the cartridge body on the lower half from the front side to the middle toward the back side; and
    a plurality of fusing portions for mating and fusing together the upper and lower halves at facing surfaces of said upper and lower halves, wherein each of said fusing portions is provided with a mating projection cylindrically formed at one of said upper and lower halves and a mating projection cylindrically formed at another of said upper and lower halves; wherein
    the mating projections formed at said another of said upper and lower halves include a flat annular end surface, and the mating projections formed at said one of said upper and lower halves include an annular end surface to be connected to said flat annular end surface and a projection which has a semicircular shape along a part of said annular end surface and which is formed on said annular end surface on said rising circumferential wall side to be fused together with said flat annular end surface to connect the upper and lower halves, wherein
    said mating projections including said semicircular shaped projections are provided at positions adjacent to where said rising circumferential walls and said walls forming said recording medium accommodating portion intersect and
    one of said fusing portions for mating and fusing said upper and lower halves is provided at a thin portion having a thickness less than that of said cartridge body formed by mating of said upper and lower halves at a front side of said opening formed in said cartridge body and at substantially a center of said cartridge body and
    another plurality of said mating projections including complete annular shaped projections are formed at one of said upper and lower halves at positions corresponding to the corners of the cartridge body, wherein
    at least one pair of fusing portions is provided positioned at the two sides of said cartridge body at which said recess portions are formed.

* * * * *

UNITED STATES PATENT AND TRADEMARK OFFICE
CERTIFICATE OF CORRECTION

PATENT NO. : 7,010,800 B2  Page 1 of 1
APPLICATION NO. : 11/086362
DATED : March 7, 2006
INVENTOR(S) : Daiki Kobayashi et al.

It is certified that error appears in the above-identified patent and that said Letters Patent is hereby corrected as shown below:

On Title Page, Item 73, insert --Assignee: Sony Corporation, Tokyo (JP)--.

Column 1, line 27, change "chacked" to --chucked--.

Column 1, line 33, change "chacked" to --chucked--.

Column 2, line 26, change "chacked" to --chucked--.

Column 5, line 53, delete "is formed".

Column 12, line 5, delete "half".

Column 13, line 63, delete "surface".

Column 15, line 28, change "togther" to --together--.

Column 15, line 38, change "prevente" to --prevent--.

Column 18, line 38, change "presentinvention" to --present invention--.

Column 19, line 20, change "o-f" to --of--.

Signed and Sealed this

Seventh Day of October, 2008

JON W. DUDAS
*Director of the United States Patent and Trademark Office*